United States Patent
Garbagnati et al.

(10) Patent No.: US 11,034,520 B2
(45) Date of Patent: Jun. 15, 2021

(54) MODULAR STRUCTURE CURVED MAGNETIC GUIDE FOR GUIDING THE CHAIN OF A CONVEYOR CHAIN

(71) Applicant: REGINA CATENE CALIBRATE S.P.A., Milan (IT)

(72) Inventors: Carlo Garbagnati, Castello di Brianza (IT); Norberto Cattaneo, Usmate Velate (IT)

(73) Assignee: REGINA CATENE CALIBRATE S.P.A., Milan (IT)

( * ) Notice: Subject to any disclaimer, the term of this patent is extended or adjusted under 35 U.S.C. 154(b) by 0 days.

(21) Appl. No.: 16/624,086

(22) PCT Filed: Jul. 18, 2018

(86) PCT No.: PCT/IB2018/055322
§ 371 (c)(1),
(2) Date: Dec. 18, 2019

(87) PCT Pub. No.: WO2019/016716
PCT Pub. Date: Jan. 24, 2019

(65) Prior Publication Data
US 2020/0148479 A1    May 14, 2020

(30) Foreign Application Priority Data
Jul. 19, 2017   (IT) .................. 102017000082253

(51) Int. Cl.
*B65G 21/20*   (2006.01)
*B65G 17/06*   (2006.01)
(Continued)

(52) U.S. Cl.
CPC ....... *B65G 21/2009* (2013.01); *B65G 17/066* (2013.01); *B65G 17/086* (2013.01);
(Continued)

(58) Field of Classification Search
CPC .. B65G 21/2009; B65G 17/068; B65G 21/16; B65G 2207/30; B65G 17/066; B65G 17/086; B65G 17/385
(Continued)

(56) References Cited

U.S. PATENT DOCUMENTS 4,805,764 A * 2/1989 van Zijderveld, Jr. ..................... B65G 21/2009
198/805
4,823,939 A * 4/1989 Langhans .......... B65G 21/2009
198/805
(Continued)

FOREIGN PATENT DOCUMENTS

EP   0903307 A1   3/1999
EP   0916599 A1   5/1999
(Continued)

OTHER PUBLICATIONS

International Search Report for corresponding application PCT/IB2018/055322 filed Jul. 18, 2018; dated Oct. 30, 2018.
(Continued)

*Primary Examiner* — Mark A Deuble
(74) *Attorney, Agent, or Firm* — Cantor Colburn LLP

(57) ABSTRACT

Curved magnetic guide for guiding the chain of a conveyor chain along a curvilinear transport direction including a pair of first guide profiles arranged spaced apart and extending in a continuous manner along a respective development direction concentric to the curvilinear transport direction, a support structure for supporting the first guide profiles having a plurality of box-shaped bodies, the box-shaped bodies being arranged in succession one after the other and spaced apart from one another along the curvilinear transport direction, where each of the box-shaped bodies houses at least one magnetic body and has an upper surface and a
(Continued)

lower surface opposite one another, where the upper surface is provided with a pair of first constraining projections that are spaced apart and faced with distances between centers substantially equal to the distance between the development directions where the first constraining projections of the plurality of box-shaped bodies define two rows of first constraining projections that extend, spaced apart from one another, along a respective the development direction, where each of the first guide profiles is coupled with the first constraining projections aligned along one of the two rows, where the guide defines a forward guide for guiding the forward branch of the chain, the forward guide having a forward channel adapted for receiving the hinging portions of the links and which is laterally delimited by the first guide profiles of the at least one pair, where the first guide profiles each defines a sliding surface for the plate-shaped portion of the links to slide thereon, and where the magnetic bodies interact with the links to attract the links of the chain with the part of their plate-shaped portions against the sliding surfaces defined by the first guide profiles.

20 Claims, 12 Drawing Sheets

(51) Int. Cl.
*B65G 21/16* (2006.01)
*B65G 17/08* (2006.01)
*B65G 17/38* (2006.01)

(52) U.S. Cl.
CPC ............ *B65G 21/16* (2013.01); *B65G 17/385* (2013.01); *B65G 2207/30* (2013.01)

(58) Field of Classification Search
USPC ........................................ 198/805, 831, 852
See application file for complete search history.

(56) References Cited

U.S. PATENT DOCUMENTS

| | | | | |
|---|---|---|---|---|
| 5,165,527 A | * | 11/1992 | Garbagnati | B65G 21/2009 198/805 |
| 5,199,551 A | * | 4/1993 | Wallaart | B65G 21/2009 198/805 |
| 6,085,896 A | * | 7/2000 | van Zijderveld | B65G 21/2009 198/841 |
| 7,121,400 B2 | * | 10/2006 | Fandella | B65G 17/086 198/619 |

FOREIGN PATENT DOCUMENTS

| | | |
|---|---|---|
| EP | 2907774 A1 | 8/2015 |
| EP | 3127839 A1 | 2/2017 |
| FR | 2444629 A1 | 7/1978 |
| WO | 0000415 A1 | 1/2000 |
| WO | 2010146098 A1 | 12/2010 |
| WO | 2016131879 A1 | 8/2016 |

OTHER PUBLICATIONS

Written Opinion for corresponding application PCT/IB2018/055322 filed Jul. 18, 2018; dated Oct. 30, 2018.

* cited by examiner

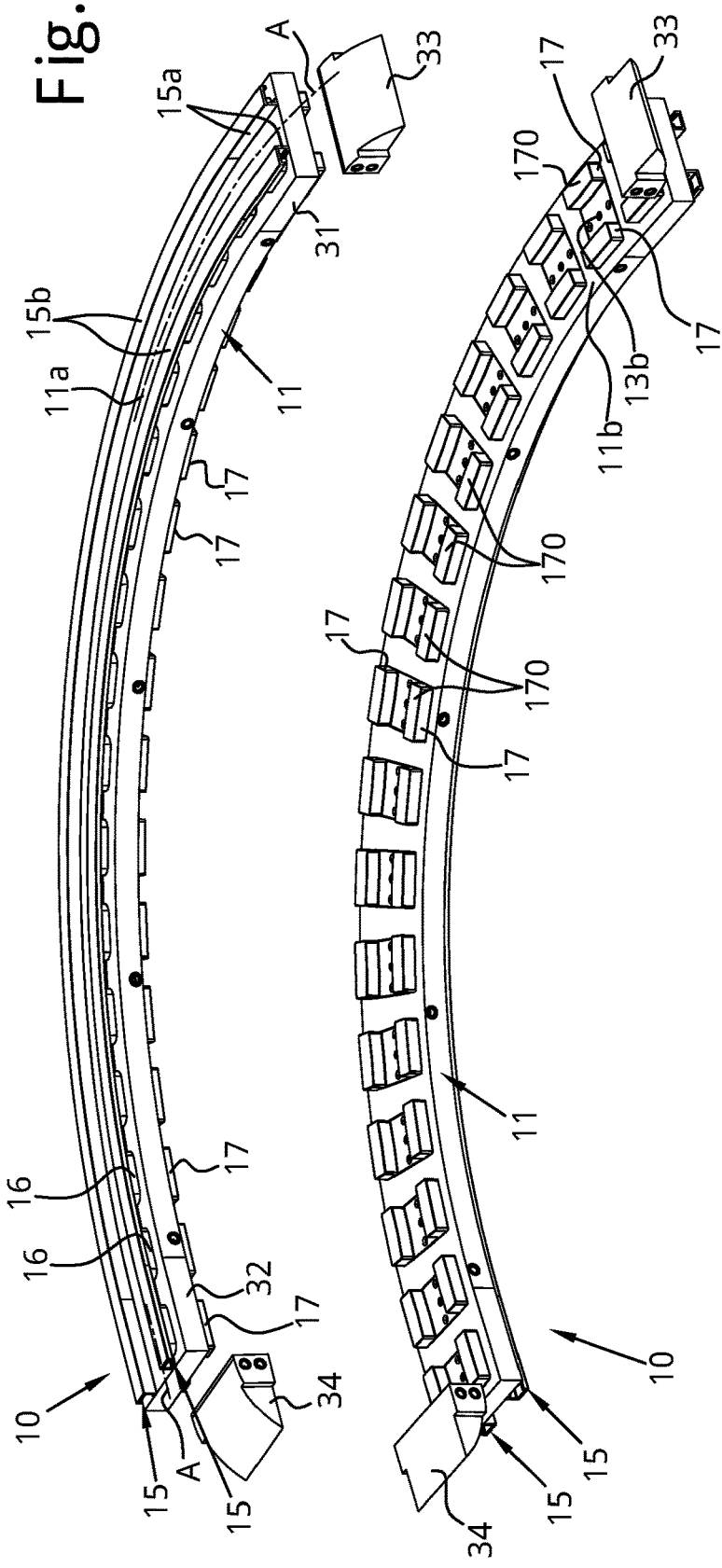

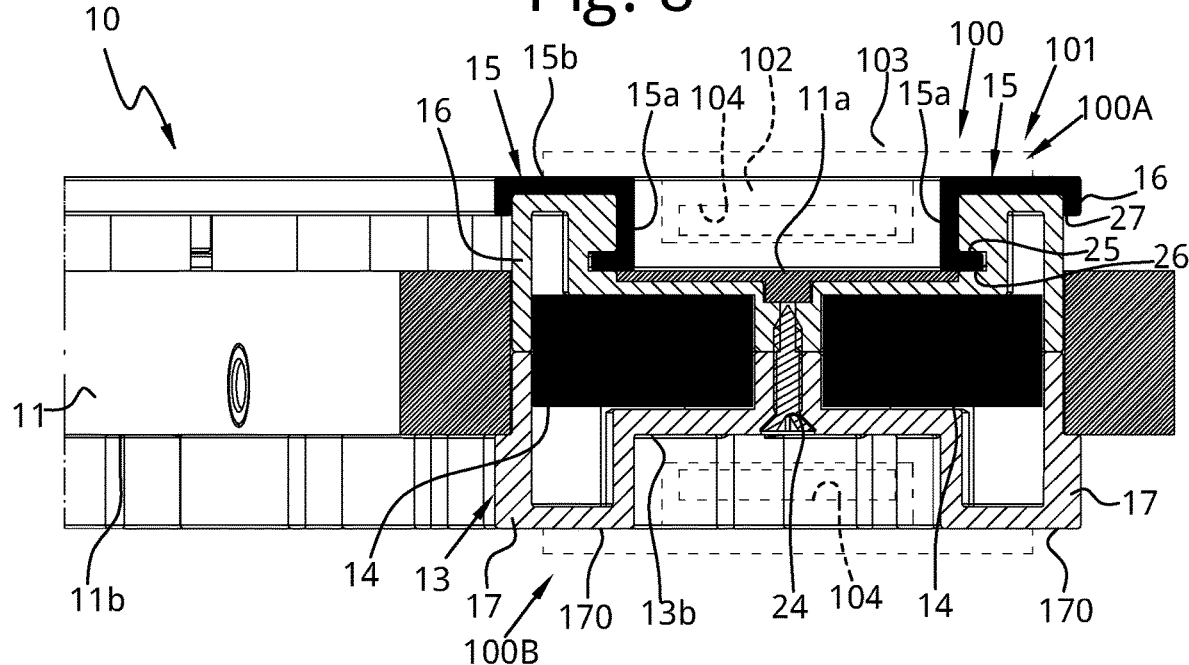
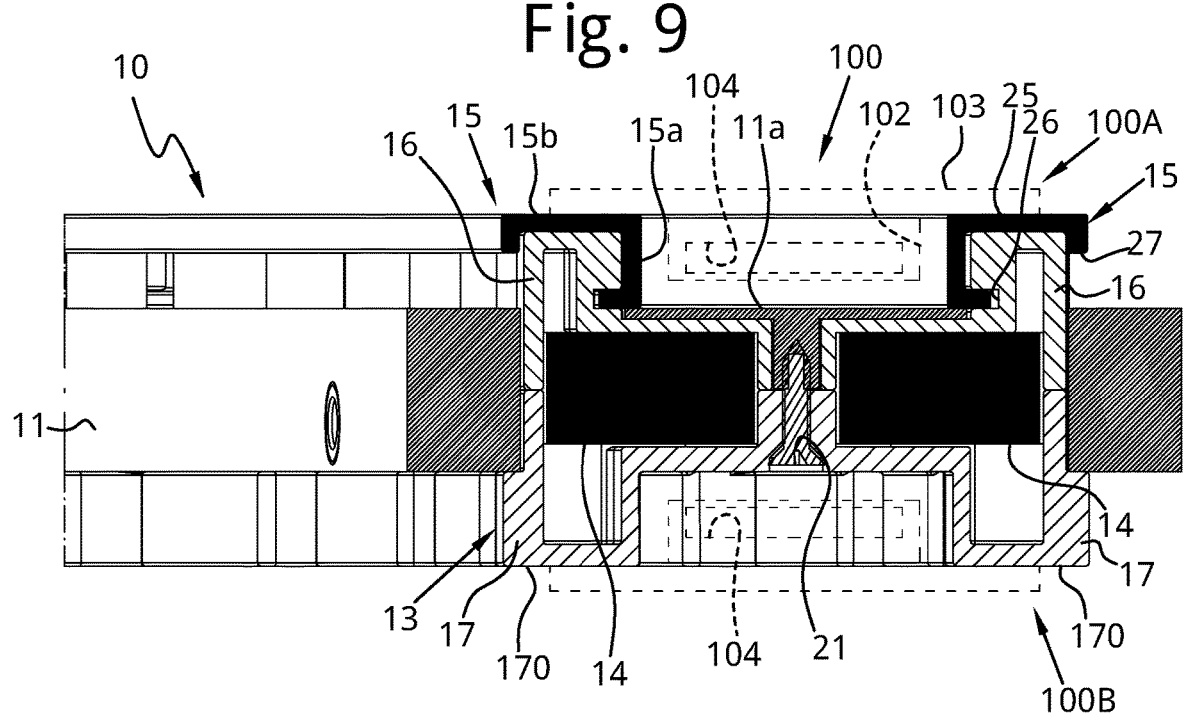

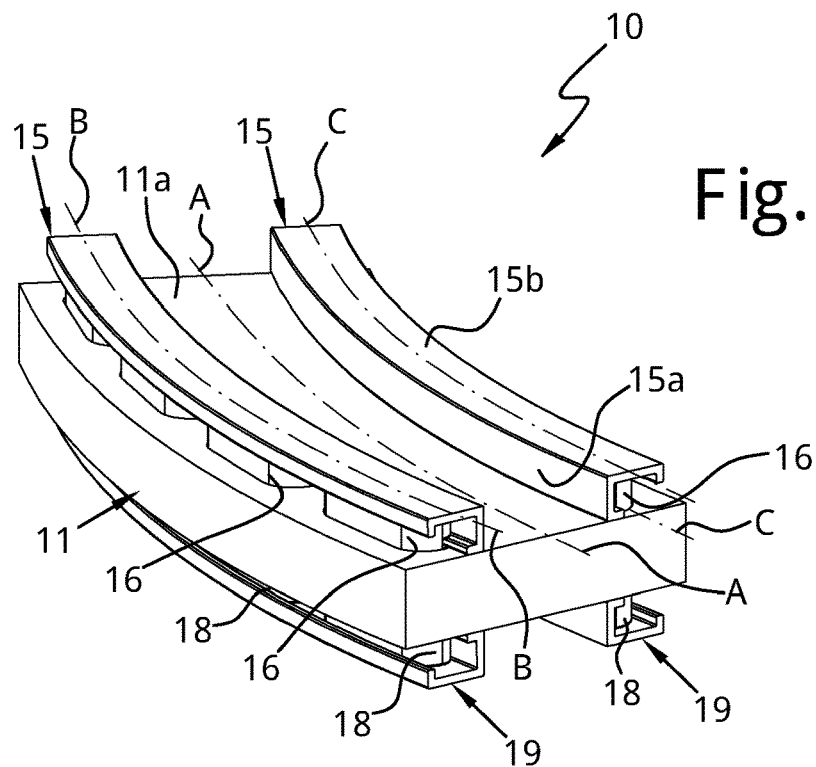
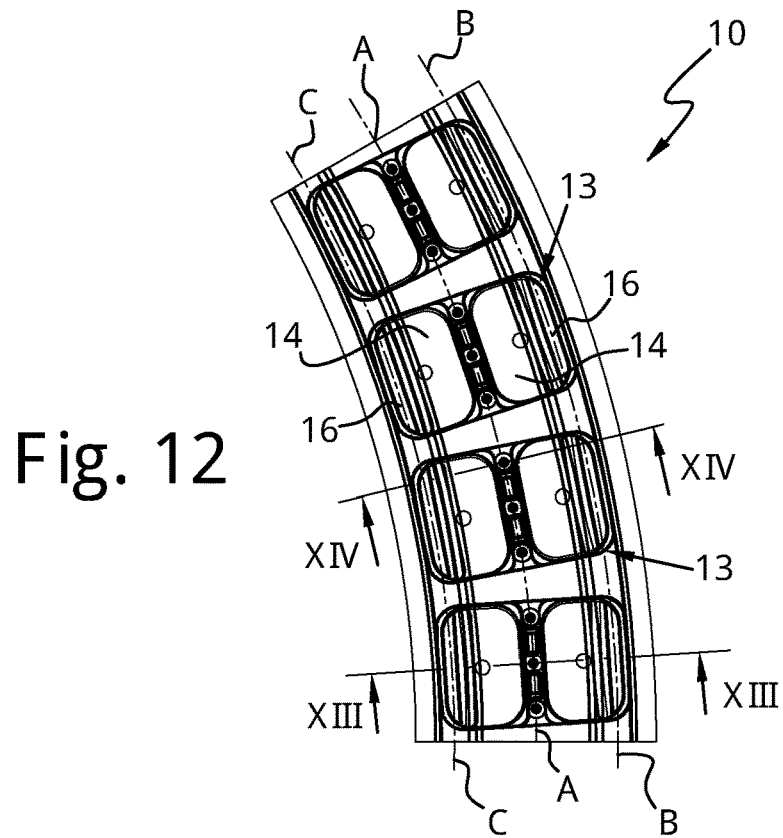

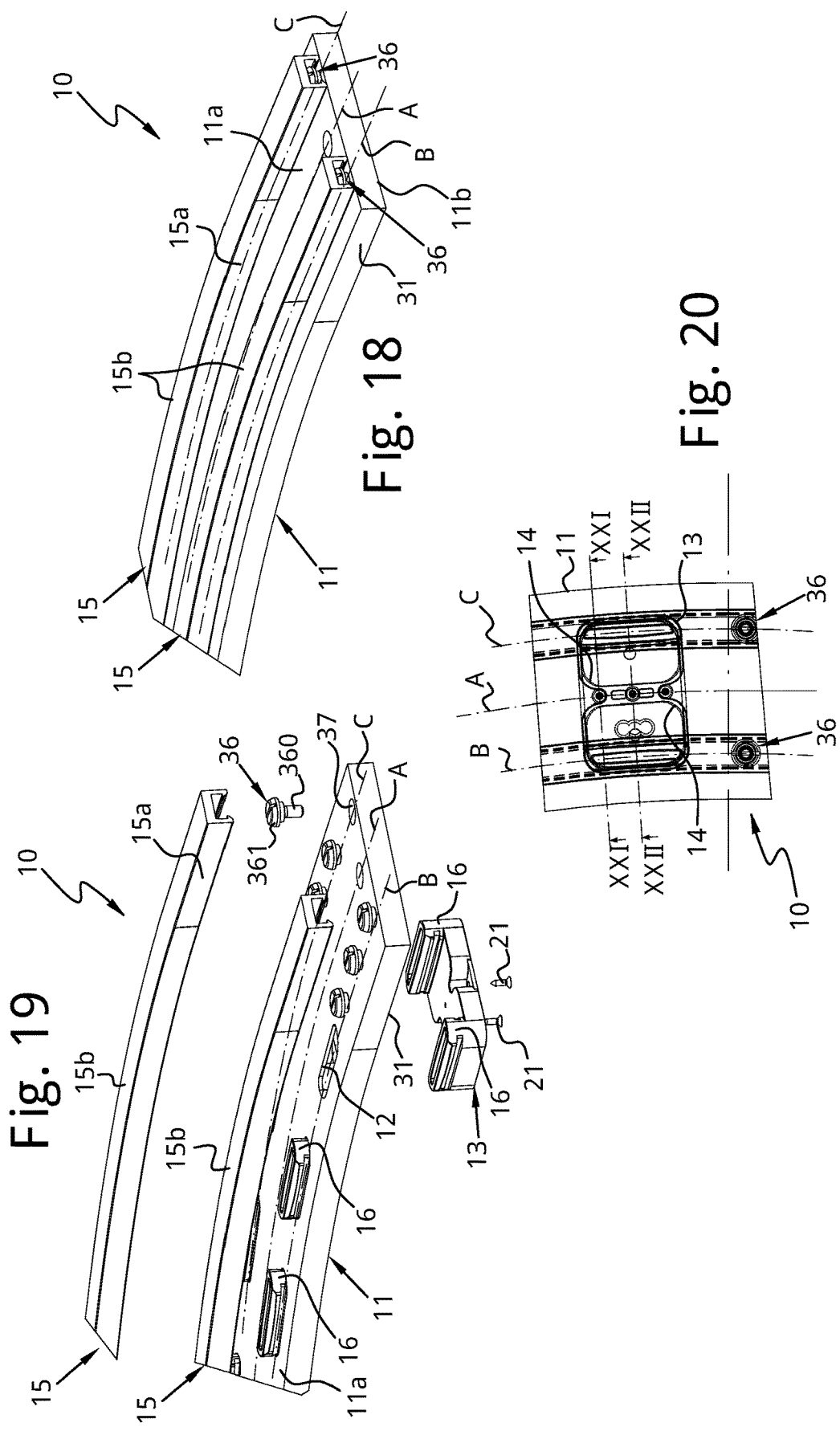

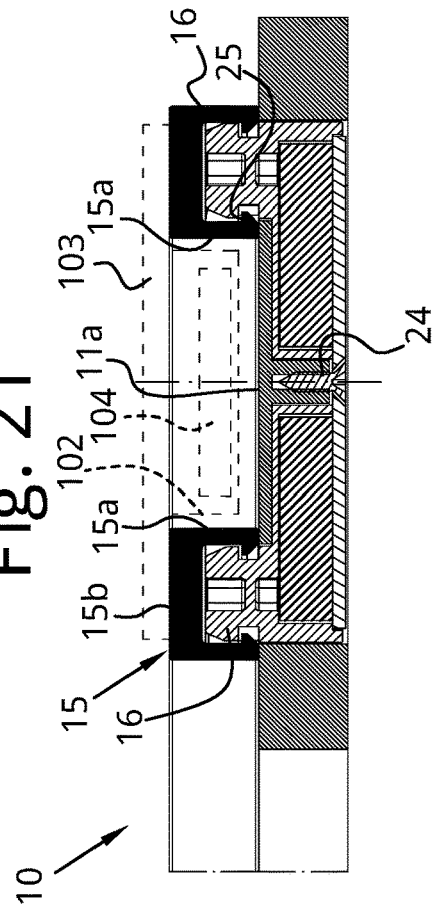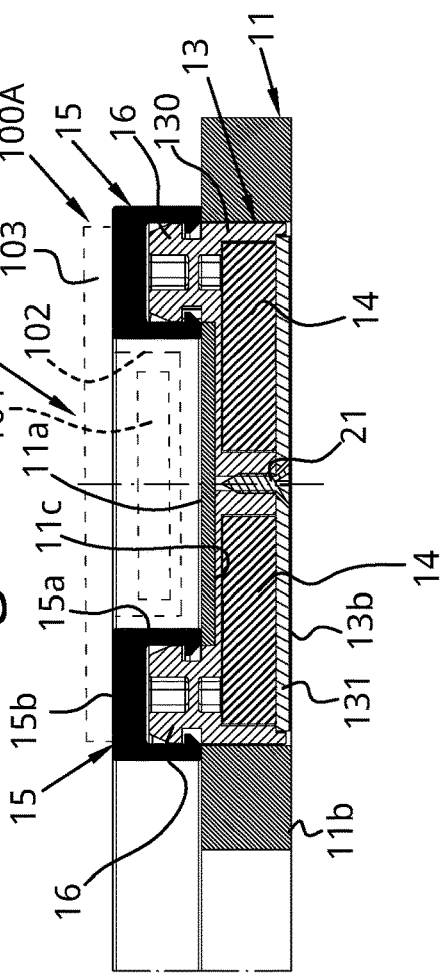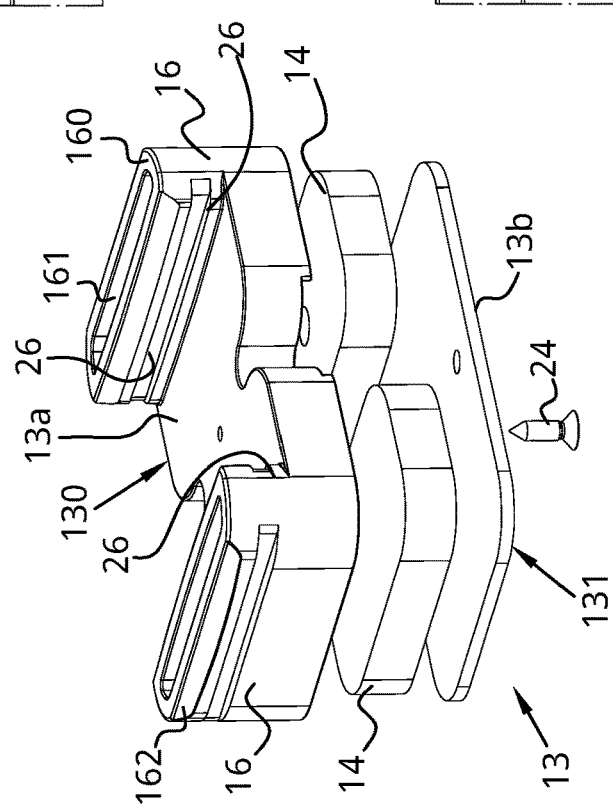

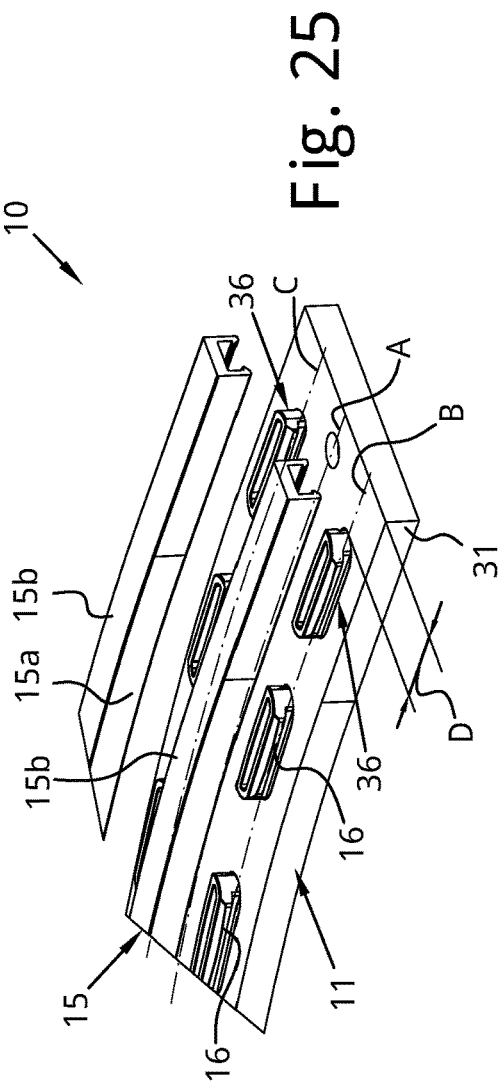
Fig. 26
Fig. 25
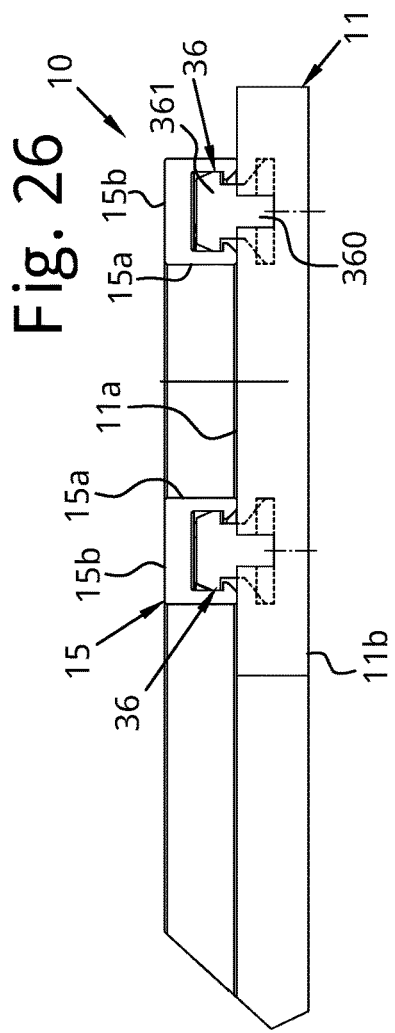
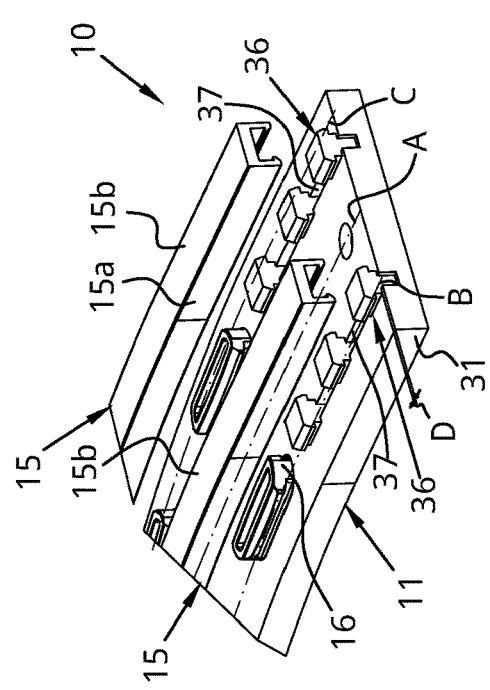
Fig. 24

MODULAR STRUCTURE CURVED MAGNETIC GUIDE FOR GUIDING THE CHAIN OF A CONVEYOR CHAIN

TECHNICAL FIELD

The present disclosure relates to a curved magnetic guide for guiding a chain of a conveyor chain having improved modular structure.

BACKGROUND

The term chain is meant to indicate in particular a so-called "table-top chain", even more in particular a "table-top chain" for curved paths of the type comprising a plurality of links, which are articulated to one another by means of hinging and each of which has a hinging portion with the adjacent links and a generally plate-like portion, which extends transversally to the transportation direction of the chain and that defines a support surface for products to be transported.

These chains are closed on themselves in a loop and wound around driving and idle wheels to form a conveyor for transporting products resting on the upper branch or forward branch of the chain itself.

These chains, as known, are mounted along guides that comprise:

a forward guide, along which at least one forward channel is formed in which the hinging portions of the links forming the forward branch of the chain run and which is delimited by a corresponding pair of forward rails, each of which defines a respective sliding surface along which a part of the plate-shaped portion of the links slides, forming the forward branch of the chain, and a return guide, along which at least one return channel is formed in which the hinging portions of the links forming the return branch of the chain run and that is delimited by a corresponding pair of return rails, each of which defines a respective sliding surface along which a part of the plate-shaped portion of the links forming the return branch of the chain slides.

The chain links are held guided against radial and circumferential forces by the interaction between their hinging portions and the forward and return channels in which they run.

The chain links are held guided against detachment forces having a component perpendicular to the sliding surfaces defined by the forward and return rails or with magnetic interaction means or with mechanical means acting as obstacle.

There are known curved magnetic guides, as for example described in EP0903307B1 in the name of REGINA SUD SPA, of the type comprising a U-shaped upper body made in a single piece and that forms at least one forward channel for guiding the forward branch of the chain. In such a type of guide, the U-shaped upper body is mounted on a lower base body that forms a fixed structure of the conveyor and that forms at least one return channel for guiding the return branch of the chain.

A plurality of magnets is inserted in seats formed in the lower base body to keep the chain in position along the forward channel, the chain being made entirely or partly of ferromagnetic material.

The return branch of the chain is, on the other hand, kept guided by mechanical means formed by grooves that extend continuously along the outer sides of the return rails and each forming a respective channel in which the ends (wings) of the plate-shaped portions of the chain links forming the return branch slide.

According to this prior art, the U-shaped upper body is coupled with the lower base body with a shape coupling of the male-female type without undercuts, which is adapted for withstanding radial and circumferential forces. According to this prior art, moreover, the U-shaped upper body is fixed to the lower base body by means of a plurality of screws, which are adapted for preventing, in usual conditions of use, the detachment of the U-shaped upper body from the lower base body in a direction perpendicular to the sliding plane of the chain.

As known, the U-shaped upper body is subject to wear and must be periodically replaced.

For this purpose, according to the prior art, it is necessary to dismount the entire guide and intervene with tools to singularly unscrew all of the screws that fix the U-shaped upper body to the lower base body; the reverse screwing and mounting operations are necessary to mount the new U-shaped upper body on the lower base body and reposition the guide in its seat. These same mounting and dismounting operations become necessary if a maintenance or replacement intervention of the magnets housed in the lower base body has to be carried out.

These operations are particularly long and laborious and require the stopping of the conveyor chain for a non-negligible time.

There are also known curved magnetic guides of the type comprising an upper base body made in a single piece and on which at least one pair of rails is mounted. Each rail is made in a single piece as a body separate and distinct from the body that forms the other rail of the pair of rails. The two rails of each pair are mounted on the upper base body parallel to one another and spaced apart so as to define a central channel that extends between them and in which the hinging portions of the links of the forward branch of the chain run. The upper surfaces of the rails of each pair define respective sliding surfaces on which parts (wings) of the plate-shaped portions of the links of the chain slide.

According to the prior art, the upper base body comprises seats in which magnets are housed, the magnets being arranged to keep the chain in position, the chain being totally or partially made of ferromagnetic material; in other words, along the forward branch, the chain is attracted by the magnetic field generated by the magnets towards the upper base body remaining in sliding contact with the sliding surfaces defined by the rails. The seats in which the magnets are housed are accessible from the lower surface of the upper base body that, in use, generally overlaps and is coupled with the upper surface of a lower base body, the latter defining the return guide for the return branch of the chain.

According to this prior art, each of the two rails of every pair is coupled with the base body with a shape coupling of the male-female type.

In some known solutions, each of the two rails of every pair is fixed to the base body with a shape coupling of the male-female type made as "keyed" coupling that extends continuously along the entire longitudinal development of the base body and that is shaped not only to withstand radial and circumferential forces, but also with undercuts configured to impede the detachment of the rails from the base body in a direction perpendicular to the sliding surfaces defined by the rails themselves.

Solutions of this type are known, for example, from WO2010/146098 in the name of Rexnord Flattop Europe Srl, in which the keyed coupling is, preferably, of the dovetailed type and extends continuously along the entire longitudinal development of the curved guide.

In these known solutions, if, due to wear, it is necessary to replace the rails, it is necessary to dismount the entire curved guide from the conveyor to then proceed with dismounting the worn rails and mounting the new rails by longitudinal sliding thereof with respect to the base body.

There are also known solutions in which each of the two rails of every pair is coupled with the upper base body with a shape coupling of the male-female type made as tooth-channel coupling devoid of undercuts; said coupling, therefore, is adapted for withstanding radial and circumferential forces. According to this prior art, moreover, each rail is fixed to the upper base body by means of a plurality of screws, which are adapted for preventing the detachment of the two rails from the upper base body in a direction perpendicular to the sliding surfaces defined by the rails. The screws are accessible from the lower surface of the upper base body, i.e. from the surface of the upper base body opposite the one on which the rails are mounted.

A guide according to this prior art is described, for example, in EP2907774 in the name of Movex S. P. A.

Also in these known solutions, if, due to wear, it is necessary to replace the rails, it is necessary to dismount the entire curved guide from the conveyor to be able to access the screws and remove them singularly to then be able to dismount the rails.

These operations are particularly long and laborious and require the stopping of the conveyor chain for a non-negligible time.

Solutions are also known, as for example described in EP3127839A1 in the name of System Plast SpA, in which the rails are formed in one piece with the upper base body to form a single body. The rails extend continuously along the entire development in length of the upper base body and their wearing surfaces are coated with coating profiles that are coupled with them with a so-called "snap-fit" coupling.

In all of these known solutions, moreover, as stated above, the magnetic bodies intended to keep the chain guided at least along the forward channel, are directly housed in seats that are formed in the upper base body and that is in turn coupled with a lower base body that defines the guide of the return branch of the chain. In the case in which it is necessary to carry out a maintenance intervention or replacement of some of the magnetic bodies it is necessary to dismount the entire guide and access the seat containing the magnetic bodies to be maintained or replaced and remount the guide, which are laborious operations that require long stopping times of the conveyor.

Finally, WO00/00415A1 describes a curved magnetic guide comprising a pair of flexible rails arranged spaced apart to form a sliding path for the transport surface of the chain links, permanent magnets arranged below the sliding path, flexible guide rails to guide the return branch of the chain and a plurality of support elements that support the rails and that are arranged spaced apart along the transport direction. According to what is described in WO00/00415A1, the magnets are housed in chambers formed in a continuous band, preferably flexible, that extends between the support elements and that is itself supported on the support elements.

BRIEF SUMMARY

The disclosure avoids the drawbacks of the prior art by providing a curved magnetic guide for guiding a chain of a conveyor chain having alternative modular structure.

The disclosure provides a curved magnetic guide for guiding a chain of a conveyor chain having improved modular structure that allows the mounting and dismounting operations of the relative components and of the relative wearing parts to be made particularly quick and easy.

The disclosure also provides a curved magnetic guide for guiding a chain of a conveyor chain having improved modular structure of reduced bulk, in particular in height.

The disclosure further provides a curved magnetic guide for guiding a chain of a conveyor chain that makes it possible to magnetically hold the chain links forming both the forward branch and the return branch respectively along the forwards guide and the return guide in a stable and safe manner using a reduced number of components with respect to known solutions, also having low costs and reduced bulks.

The disclosure also provides a curved magnetic guide for guiding a chain of a conveyor chain having improved modular structure that is particularly simple and functional, with low costs also thanks to the possibility of using lower cost materials to make most of the elements making up the guide.

The disclosure further provides a curved magnetic guide for guiding a chain of a conveyor chain having an improved modular structure that allows curved guides of different radius of curvature and/or length to be made with a low number of components.

BRIEF DESCRIPTION OF THE DRAWINGS

The characteristics and advantages of a curved magnetic guide for guiding a chain of a conveyor chain having improved modular structure according to the present disclosure will become clearer from the following description, given as an example and not for limiting purposes, referring to the attached schematic drawings, in which:

FIGS. 1 and 2 are axonometric views, from above and from below respectively, of a first possible embodiment of a curved magnetic guide according to the present disclosure;

FIGS. 8 and 9 are sections respectively according to the planes VIII-VIII and IX-IX of FIG. 7;

FIG. 10 is an axonometric view of a portion of a curved magnetic guide according to a second possible embodiment of the present disclosure;

FIG. 12 is a plan view from above of FIG. 10;

FIG. 18 shows an axonometric view of a portion of a further possible embodiment of a curved magnetic guide according to the present disclosure;

FIG. 19 is a partially exploded view of the curved magnetic guide of FIG. 18;

FIG. 20 is a transparent plan view from above of a portion of the curved guide of FIG. 18;

FIGS. 21 and 22 are sections respectively according to the plane XXI-XXI and XXII-XXII of FIG. 20;

FIG. 23 shows an axonometric and exploded view of an alternative embodiment of a box-shaped body of a curved guide according to the present disclosure;

FIGS. 24 and 25 are axonometric and partially exploded views of further possible embodiments of a curved magnetic guide according to the present disclosure that differ from one another by the configuration of support elements of the end portions of the guide profiles;

FIG. 26 is a top front side view of a portion of a further embodiment of the curved magnetic guide according to the present disclosure that shows further possible alternative configurations of the support elements of the end portions of the guide profiles.

DETAILED DESCRIPTION

Figure 3:
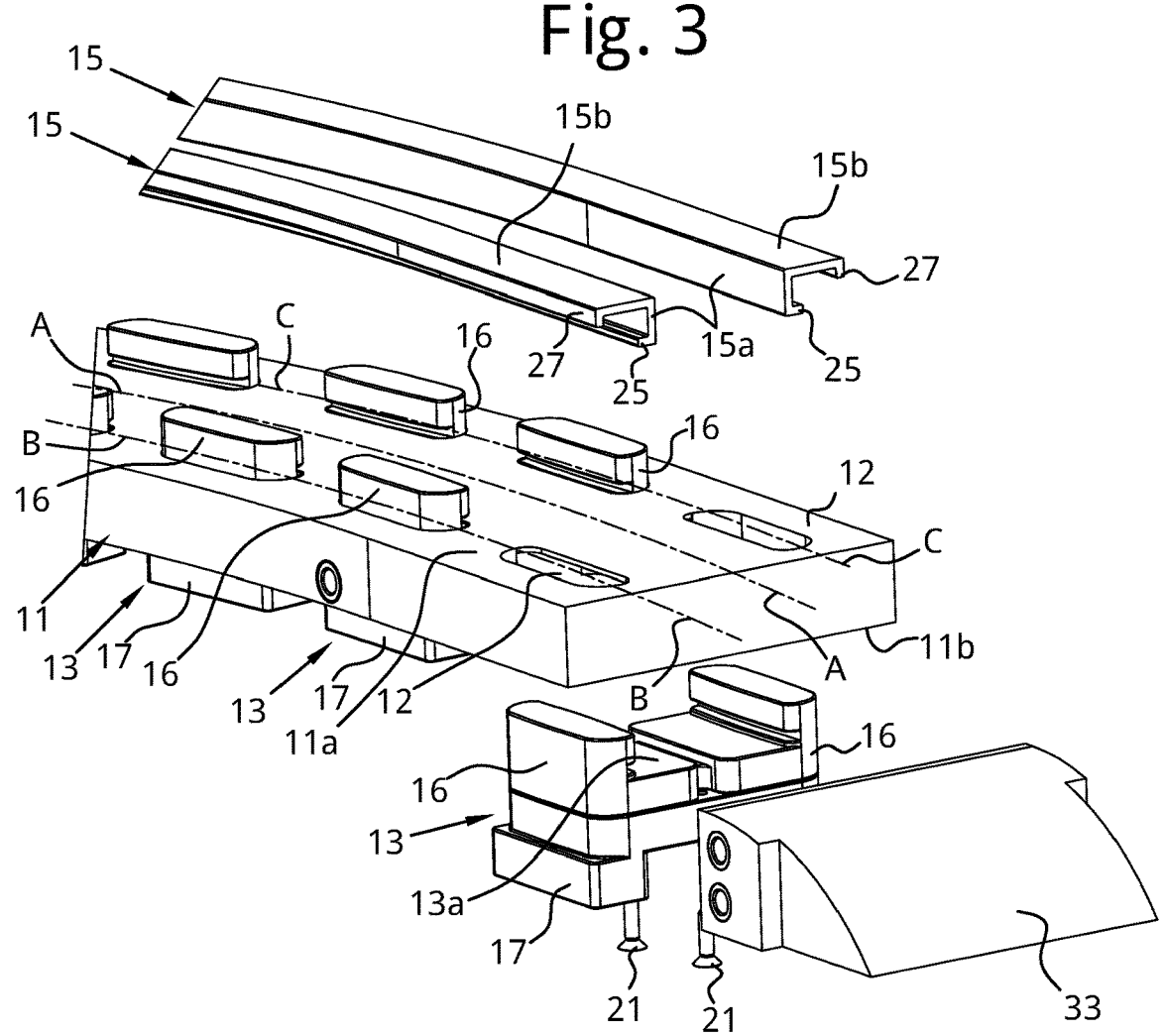
FIG. 3 is a partially exploded view of a portion of the guide according to FIGS. 1 and 2.
Figure 4:
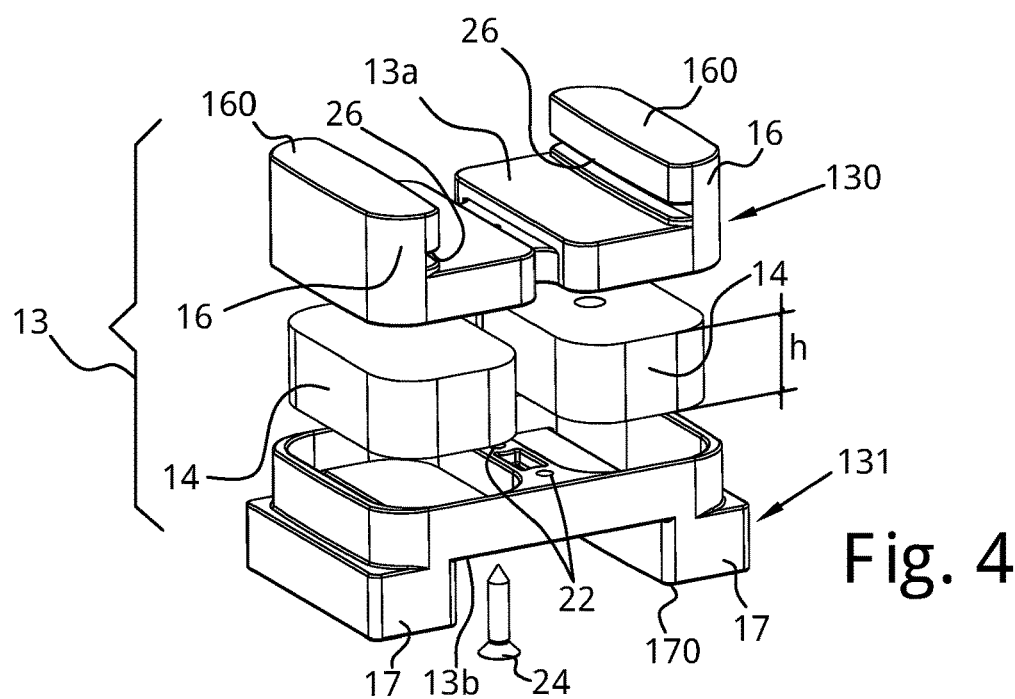
FIG. 4 is an exploded view of one of the box-shaped bodies of the guide according to FIGS. 1 to 3.
Figure 5:
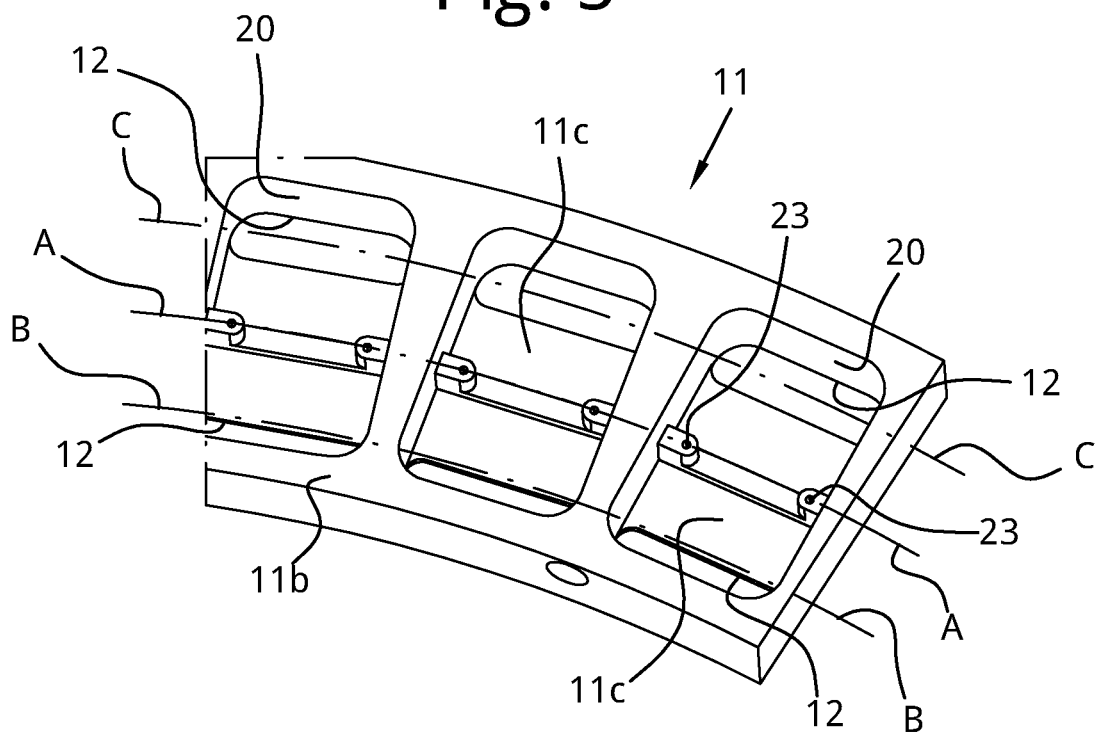
FIG. 5 is an axonometric view from below of a portion of the plate-shaped body of a guide according to the present disclosure.
Figure 6:
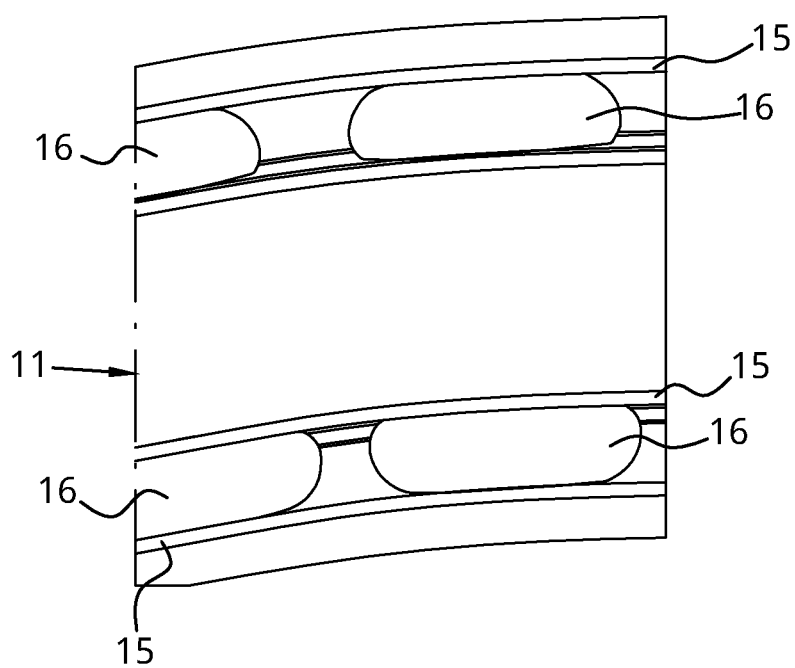
FIG. 6 is a schematic section view showing the coupling between the first guide profiles and the portions of the respective first constraining projections of the box-shaped bodies.
Figure 7:
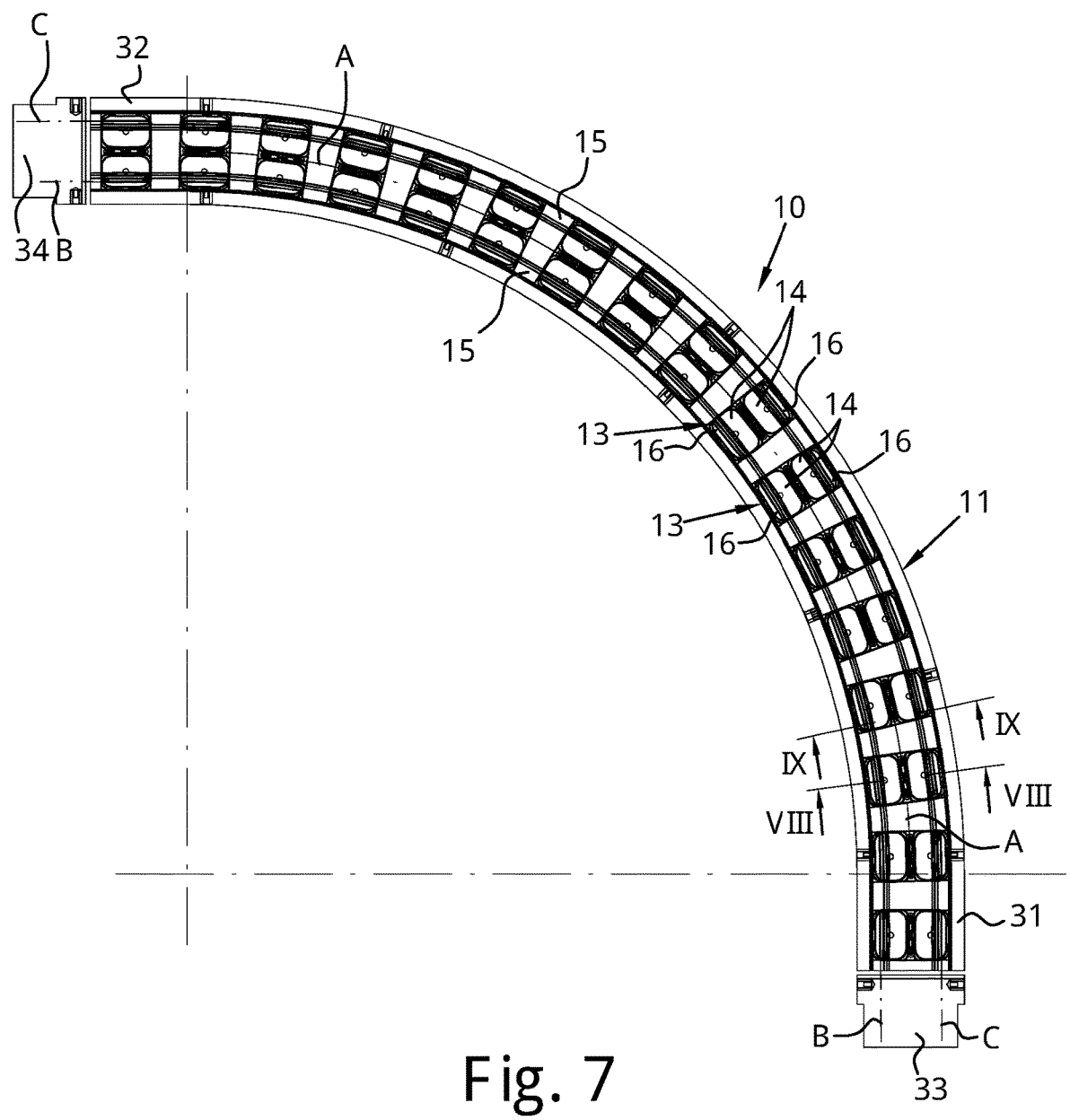
FIG. 7 is a transparent plan view from above of FIG. 1.
Figure 11:
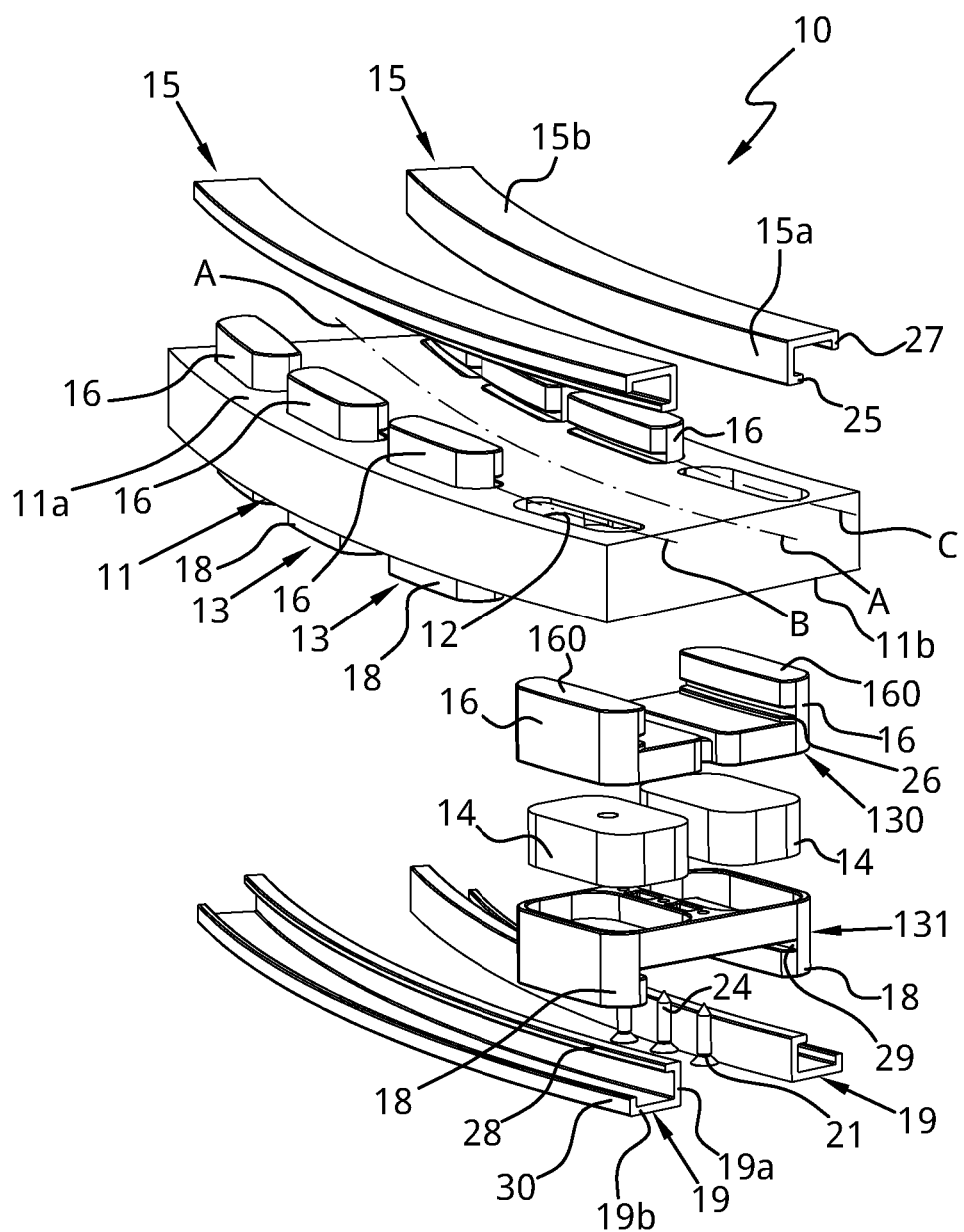
FIG. 11 is an exploded view of FIG. 10.
Figure 13:
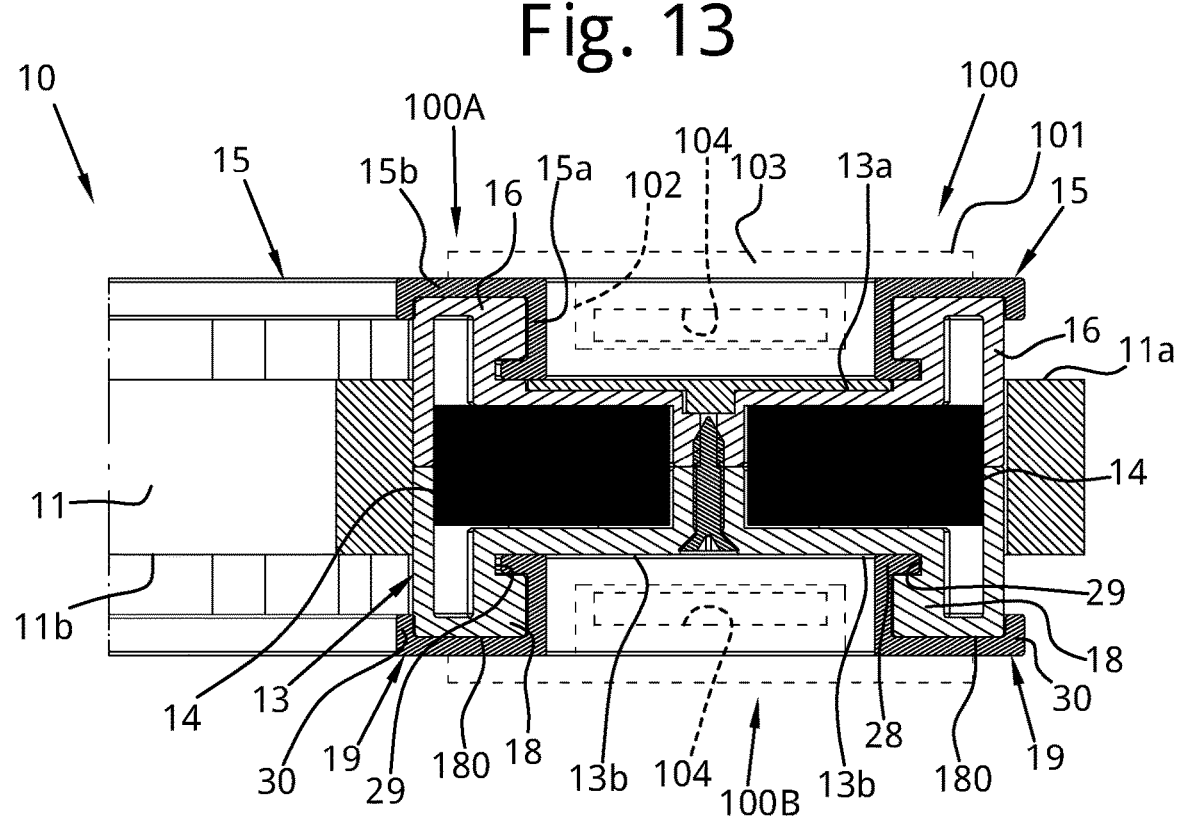
FIGS. 13 and 14 are sections respectively according to the planes XIII-XIII and XIV-XIV of FIG. 12.
Figure 14:
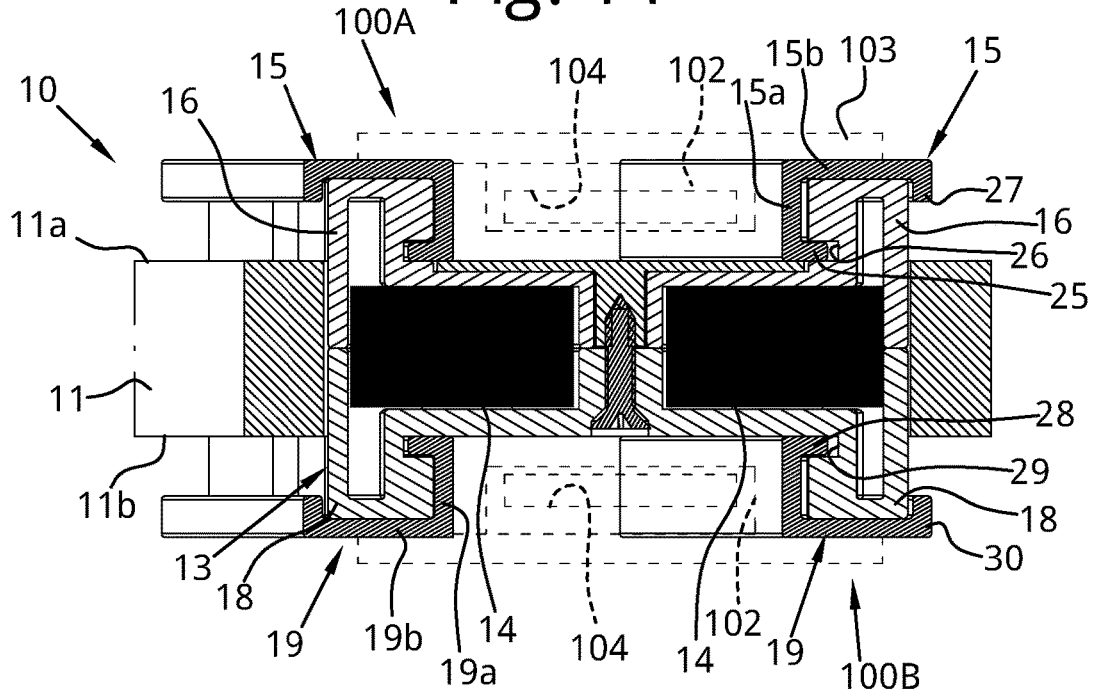

With reference to the attached figures, a curved magnetic guide 10 for a conveyor chain 100 is shown.

It should be specified that in the following description adjectives like "lower" and "upper" refer to the guide 10 considered in the usual conditions of use with respect to a generally horizontal support plane. Adjectives like "longitudinal" and "transversal" refer to the development of the guide 10 respectively along the guide path and transversally thereto.

In the present description the same or corresponding elements will be indicated with the same reference numeral.

The conveyor chain 100 is of the type known by those skilled in the art.

The conveyor chain 100 is only schematically represented in some of the attached figures.

The chain 100 is at least partially made of magnetisable material and comprises a plurality of links 101, which are hinged together at respective hinging portions 102 by means of respective pins 104 and each of which is equipped with a plate-shaped portion 103 defining a transport surface on which products to be conveyed are placed.

The links 101 of the chain 100 can be made at least partially from magnetisable material or from plastic material in which a filler of particles made of magnetisable material is dispersed.

Alternatively, the links 101 can be made of plastic material and the pins that articulate the links 101 to one another are made of a magnetisable material.

The term magnetisable material is meant to indicate, in particular, a ferromagnetic material.

The chain 100 is wound in a loop around driving and return wheels, not shown in the figures since they are of the known type, and defines a forward branch 100A and a return branch 100B. The forward branch 100A is the upper branch of the chain 100 that is active in conveying the products. The return branch 100B is the lower branch of the chain 100.

In particular, the guide 10 is arched to define a curve of defined radius that develops along a curvilinear transport direction A-A.

The guide 10 comprises:

at least one pair of first guide profiles 15 that are arranged spaced apart and that develop continuously along a respective development direction B-B, C-C concentric to the transport direction A-A, a support structure that supports the at least one pair of first guide profiles 15 and that comprises at least one plurality of box-shaped bodies 13, said box-shaped bodies 13 being arranged in succession one after the other and spaced apart along the curvilinear transport direction A-A and each of which houses at least one magnetic body 14 therein, wherein the first guide profiles 15 are coupled, in a removable manner, with portions of the box-shaped bodies 13 that form pairs of first constraining projections 16; the first guide profiles 15 laterally delimit a forward channel for guiding the forward branch 100A of the chain.

In greater detail, each of the box-shaped bodies 13 has an upper surface 13a and a lower surface 13b opposite one another, in which the upper surface 13a is provided with a pair of first constraining projections 16 that are spaced apart and faced with distances between centres substantially equal to the distance between the development directions B-B, C-C. The first constraining projections 16 of the plurality of box-shaped bodies 13 (said box-shaped bodies 13 are arranged in succession one after the other and spaced apart from one another) define two rows of first constraining projections 16 that extend, spaced apart from one another and substantially parallel, along a respective development direction B-B, C-C. Each row of first constraining projections 16 comprises a plurality of first constraining projections 16 that are aligned one after the other and spaced apart from one another with non-zero distance.

Each of the first guide profiles 15 is coupled with the first constraining projections 16 aligned along one of the two rows.

The guide 10 thus defines at least one forward guide for guiding the forward branch 100A of the chain. The forward guide comprises a forward channel, in which the hinging portions 102 of the links 101 are received in use and that is laterally delimited by the first guide profiles 15. The first guide profiles 15 each define a sliding surface for at least one part of the plate-shaped portion 103 of the links 101 to slide thereon.

The magnetic bodies 14 interact with the links 101 or with their pins 104 to attract the links with part of their plate-shaped portions 103 against the respective sliding surfaces defined by the first guide profiles 15.

In a possible embodiment shown in FIGS. 18 to 26, each box-shaped body 13 comprises only first constraining projections 16 that project from the upper surface 13a thereof and on which the first guide profiles 15 couple. The lower surface 13b of each box-shaped body 13 is substantially flat. As described hereinafter and as can be seen from the attached FIGS. 18 to 26, in this case each box-shaped body 13 is substantially C or U-shaped. In this case, moreover, each box-shaped body 13 encloses at least one magnetic body 14 inside it that is adapted for interacting with the links 101 or with the pins 104 of the chain along the forward branch 100A. In this case, moreover, the guide of the return branch 100B, not represented in FIGS. 19 to 26, can be of the mechanical type, according to one of the known solutions and as for example shown in EP0903307B1, or of the magnetic type having, for example, a configuration mirroring that of the forward guide obtained by arranging a plurality of box-shaped bodies 13 (C or U-shaped and each enclosing at least one respective magnetic body 14 inside it) in succession one after the other and spaced apart along the curvilinear transport direction A-A, inverted downwards and with the first constraining projections of which respective guide profiles can possibly be coupled.

In other possible alternative embodiments of the guide 10, each box-shaped body 13 can also comprise:
a pair of guide projections 17 that project beneath it (as shown in FIGS. 1 to 9) or, alternatively
a pair of second constraining projections 18 with which respective second guide profiles 19 are removably coupled (as shown in FIGS. 10 to 14).

As described hereinafter and as can be seen in the attached FIGS. 1 to 14, in such further possible alternative embodiments each box-shaped body 13 is substantially H-shaped and defines—together with the first guide profiles 15 and, if present, with the second guide profiles 19—both a forward guide for guiding the forward branch 100A of the chain, and a return guide for guiding the return branch 100B of the chain. In this case, each box-shaped body 13 encloses at least one magnetic body 14 inside it, which is adapted for interacting with the links 101 or with the pins 104 of the chain both along the forward branch 100A and along the return branch 100B; i.e. the chain 100 is held along the forward guide and along the return guide by magnetic attraction exerted by the magnetic bodies 14 enclosed in each box-shaped body 13.

In the first case (FIGS. 1 to 9), the pairs of guide projections 17, together with the portion of the lower surface 13b of the box-shaped bodies 13 that extends between them, define a return channel for guiding the return branch 100B of the chain 100.

In the second case (FIGS. 10 to 14), the second guide profiles 19, together with the portion of the lower surface 13b of the box-shaped bodies 13 that extends between them, define a return channel for guiding the return branch 100B of the chain 100.

In a preferred embodiment, the support structure also comprises at least one plate-shaped body 11 crossed in thickness by a plurality of slots 12 that are distributed, one after another and spaced apart from one another, along two mutually spaced rows concentric to the curvilinear transport direction A-A along a respective development direction B-B, C-C.

In this case, the box-shaped bodies 13, whether they are C, U or H-shaped, are coupled and fixed, at the bottom and in a removable manner, to the plate-shaped body 11 with the respective first constraining projections 16 that are inserted and that cross the slots 12 of the plate-shaped body 11 projecting for at least one portion of their height beyond the upper surface of the plate-shaped body 11 itself.

The first guide profiles 15 are coupled in a removable manner with the portion of the first constraining projections 16 that projects out from the upper surface of the plate-shaped body 11.

The first guide profiles 15 and the portion of the upper surface of the plate-shaped body 11 that extends between them define a forward channel for guiding the forward branch of the chain 100.

In greater detail and with reference to the embodiments represented in the attached figures, the plate-shaped body 11 has:
a development in length that extends along the transport direction A-A,
a development in width that extends transversally to the transport direction A-A and
a thickness or height along a direction perpendicular to the transport plane defined by the chain 100.

The plate-shaped body 11 is shaped, along its development in length, according to an arc of curve that develops along the transport direction A-A.

The plate-shaped body 11 has an upper surface 11a and a lower surface 11b that are opposite one another and is crossed by a plurality of through-slots 12 that extend between its lower surface 11b and its upper surface 11a.

The slots 12 are distributed, one spaced from the other by a non-zero distance, along two rows that extend, spaced apart, along a respective development direction B-B, C-C substantially concentric to the transport direction A-A.

Each slot 12 of one of the two rows faces a respective slot 12 of the other row so as to define pairs of facing slots with respect to a longitudinal middle plane of the plate-shaped body 11.

The plate-shaped body 11 comprises a single body obtained in one piece by mechanical processing or by injection moulding of polymeric material.

The portion of the upper surface 11a of the plate-shaped body 11 that extends between the two rows of slots 12 is flat and continuous, i.e. it is devoid of openings, concavities or convexities.

For each pair of mutually facing slots 12, moreover, the plate-shaped body 11 comprises a respective hollow seat 20 in which at least the box-shaped portion of the respective box-shaped body 13, i.e. the portion of the respective box-shaped body 13 delimited by the upper surface and by the lower surface thereof, is inserted, from which surfaces the first constraining projections 16 and, if present, the guide projections 17 or the second constraining projections 18 respectively project.

Each hollow seat 20 is open at the lower surface 11b of the plate-shaped body 11 so as to define a gap for the insertion therein of the respective box-shaped body 13.

The bottom of each hollow seat 20 is closed at a central portion thereof laterally delimited by the slots 12 of the respective pair of mutually facing slots.

As is clear from the attached figures, the depth of each hollow seat 20 is such as to completely receive the box-shaped portion of the respective box-shaped body 13 inserted in it, so that the lower surface of the latter is substantially flush with the lower surface 11b of the plate-shaped body 11 or recessed, backwards with respect to it.

In the case in which the box-shaped bodies 13 are C or U-shaped overall (FIGS. 18 to 26), the entire lower surface 13b thereof is substantially flush with the lower surface 11b of the plate-shaped body 11 or recessed, backwards with respect to it.

In the case in which the box-shaped bodies 13 are H-shaped overall (FIGS. 1 to 17), the lower surface 13b thereof that extends between the guide projections 17 or between the second constraining projections 18 is substantially flush with the lower surface 11b of the plate-shaped body 11 or recessed, backwards with respect to it.

The surface of the bottom of the hollow seat 20 facing towards the inside of the latter defines a support or abutment surface 11c for the upper surface 13a of the respective box-shaped body 13.

Each box-shaped body 13 is removably fixed to the plate-shaped body 11. For example, each box-shaped body 13 is removably fixed to the plate-shaped body 11 by means of threaded members, like, for example, screws 21, which cross through-holes 22 formed in the respective box-shaped body 13 and engage in corresponding threaded holes 23 formed in the plate-shaped body 11 and, in particular, in the portion of the plate-shaped body 11 that defines the closed bottom of the respective hollow seat 20. However, this does not rule out alternative embodiments of the fixing members of each box-shaped body 13 to the plate-shaped body 11, which, for example, could be of the interlocking or other type.

Each box-shaped body 13 is generally C, U or H-shaped and houses at least one magnetic body 14 inside it.

Each box-shaped body 13 comprises a box-shaped portion that has an upper surface 13a and a lower surface 13b opposite one another.

The upper surface 13a is provided with a pair of first constraining projections 16 that are spaced apart and faced with distances between centres substantially equal to the distance between the development directions B-B and C-C of the two rows of slots 12 or of the two first guide profiles 15.

The first constraining projections 16 project from the upper surface 13a of the respective box-shaped body 13 and can be inserted in the slots 12 of one of the pairs of slots of the plate-shaped body 11.

The first constraining projections 16, seen in plan from above have a shape substantially matching that of the slots 12.

The first constraining projections 16 have a development in height sized so that, when the respective box-shaped body 13 is coupled with the plate-shaped body 11, so as to insert with the respective box-shaped portion in the corresponding hollow seat 20 resting with its upper surface 13a against the support surface 11c, they insert in the slots 12 of one of said pairs of slots and project for at least one portion of their height beyond the upper surface 11a of the plate-shaped body 11.

According to a possible embodiment shown in FIGS. 18 to 26, the lower surface 13b of each box-shaped body 13 is substantially flat, i.e. without projections and in particular without guide projections 17 or second constraining projections 18. In this case, each box-shaped body 13 is substantially C or U-shaped.

According to a further possible embodiment, shown in FIGS. 1 to 9, the lower surface 13b of each box-shaped body 13 is on the contrary provided with a respective pair of guide projections 17 that are spaced apart and face one another and that are substantially parallel to one another with distances between centres substantially equal to the distance between the development directions B-B and C-C of the two rows of slots 12 or of the two first guide profiles 15. In this case, each box-shaped body 13 is substantially H-shaped. The guide projections 17 project from the lower surface 13b of the respective box-shaped body 13 and are shaped like prismatic or parallelepiped solids. The guide projections 17 define two rows of guide projections 17 that extend along a respective development direction B-B, C-C; each row comprises a succession of guide projections 17 aligned with each other and spaced apart by a non-zero distance. As will become clearer hereinafter, these guide projections 17 help to delimit the return channel to guide the return branch 100B of the chain 100, the side edges of which are clearly discontinuous along the transport direction A-A.

According to a further possible embodiment, shown in FIGS. 10 to 14, the lower surface 13b of each box-shaped body 13 is provided with a respective pair of second constraining projections 18 on which respective second guide profiles 19 couple. Also in this case, each box-shaped body 13 is substantially H-shaped. The second constraining projections 18 project from the lower surface 13b of the respective box-shaped body 13 and are shaped like prismatic or substantially parallelepiped solids. The second constraining projections 18 define two rows of second constraining projections 18 that extend along a respective development direction B-B, C-C; each row comprises a succession of second constraining projections 18 aligned with each other and spaced apart by a non-zero distance.

It should be noted that both the first constraining projections 16 and, if present, the second constraining projections 18 have the opposite sides that extend along the transport direction A-A that are not perfectly rectilinear, but arched with large radius of curvature so as to promote the coupling with them of the first guide profiles 15 and of the second guide profiles 19, respectively, and the adaptation of the latter to the curvature of the guide 10.

For this purpose, moreover, the extreme ends of the first constraining projections 16 and of the possible second constraining projections 18 are also suitably rounded, so as to define an assisting profile for the coupling and/or the bending, respectively, of the first guide profiles 15 and of the second guide profiles 19.

Moreover, it should be noted that the first constraining projections 16, the possible guide projections 17 and the possible second constraining projections 18 end, at the respective end opposite to that joined, respectively, to the upper surface 13a and to the lower surface 13b of the respective box-shaped body 13, with a flat, level surface, devoid of concavities, convexities or discontinuities respectively indicated with 160, 170 and 180. Such a flat surface indeed defines, in the case of the first constraining projections 16 and of the possible second constraining projections 18, a resting abutment of the portion of the first guide profiles 15 and of the second guide profiles 19 on which the plate-shaped portions of the links 101 slide and, in the case of the possible guide projections 17, the (discontinuous) sliding surface on which the plate-shaped portions 103 of the links 101 slide. This does not rule out the possibility that the first constraining projections 16, the possible guide projections 17 and the possible second constraining projections 18 can have weight reduction sections that open at the respective end opposite to the one joined respectively to the upper surface 13a and to the lower surface 13b of the respective box-shaped body 13 and that, in any case, has a flat, level surface without concavities, convexities or discontinuities. Thus, for example, as shown in FIGS. 18 to 26, the first constraining projections 16 can have weight reduction sections 161 that open at the respective end opposite the one joined to the upper surface 13a where they form a slot surrounded by the surface 160.

Further weight reduction sections in the form of recesses can also be provided inside each box-shaped body 13. Of course, such weight reduction sections can also be provided in the embodiments shown in FIGS. 1 to 17.

Advantageously, each box-shaped body 13 comprises a pair of half-shells coupled together and removably fixed: a first half-shell 130, which defines the upper surface 13a of the respective box-shaped body 13, and a second half-shell 131, which defines the lower surface 13b of the respective box-shaped body 13.

The first half-shell 130 comprises a central portion that acts as a bridge between the respective two first constraining projections 16 and that defines a section of the box-shaped portion of the respective box-shaped body 13 that receives the magnetic bodies 14.

The second half-shell 131 can be shaped like a plate in the case in which the box-shaped bodies 13 are C or U-shaped overall (FIGS. 18 to 26). In this case, the second half-shell 131 indeed comprises a plate the surface of which that defines the lower surface 13b of the box-shaped body 13 is substantially flat, planar and without projections.

On the other hand, in the case in which the box-shaped bodies 13 are H-shaped (FIGS. 1 to 17), the second half-shell 131 comprises a central portion that acts as a bridge between the respective two guide projections 17 or between the respective two second constraining projections 18 and that defines a section of the box-shaped portion of the respective box-shaped body 13 that receives the magnetic bodies 14.

The first half-shell 130 is C or U-shaped, the second half-shell 131 on the other hand, can be shaped like a plate or also C or U-shaped. Each box-shaped body 13 is therefore C or U-shaped or, alternatively, H-shaped overall. The box-shaped portion of each box-shaped body delimited between the upper surface 13a and the lower surface 13b thereof has a shape and size substantially matching those of the respective hollow seat 20 of the plate-shaped body 11. It is clear that each box-shaped body 13 defines containment seats of the magnetic bodies 14 inside them, said seats being formed in the box-shaped portion thereof.

It is also clear that each box-shaped body 13 (whether it is C, U or H-shaped overall) or at least the box-shaped portion thereof is closed indeed forming a box in which at least one magnetic body 14 is contained.

The first half-shell 130 and the second half-shell 131 are fixed together removably for example by means of threaded members comprising at least one screw 24. However, this does not rule out alternative embodiments of the fixing members of the first half-shell 130 and of the second half-shell 131 to one another, which for example could be of the interlocking type.

It should be noted that, in the case in which the box-shaped bodies 13 are provided at the bottom with the second constraining projections 18 on which the respective second guide profiles 19 couple, they—and, in particular the first half-shell 130 and the second half-shell 131—can be made of a polymeric material also having poor characteristics of resistance to wear like, for example, polyamides and, therefore, they can be obtained by moulding with clear advantages in terms of production cost.

On the other hand, in the case in which the box-shaped bodies 13 are provided at the bottom with the guide projections 17, the second half-shell 131 must be made of a material having high characteristics of resistance to wear like, for example, high-density polyethylene obtained by mechanical processing or alternatively another mouldable technopolymer.

On the other hand, in the case in which the box-shaped bodies 13 are C or U-shaped, the second half-shell 131 is shaped like a plate that, in a preferred embodiment, is made of metallic material, preferably ferromagnetic material cooperating with the magnetic bodies 14.

Each box-shaped body 13 houses at least one magnetic body 14 inside it.

In a preferred embodiment, each box-shaped body 13 houses a pair of magnetic bodies 14 inside it.

The magnetic bodies 14 are sized and arranged so that the field generated by them interacts with the chain 100 or with the pins 104 thereof at least along the forward channel of the guide 10 and, advantageously and preferably, also along the return channel of the guide 10, avoiding the detachment thereof along directions having a non-zero component perpendicular to the sliding plane defined by the chain.

In the case in which the box-shaped bodies 13 are C-shaped (FIGS. 18 to 26), inside each of them a pair of magnetic bodies 14 is housed, which rest on the second half-shell 131, which comprises a metallic gap plate. In this case, each magnetic body 14 can have a height equal to or less than 8 mm.

On the other hand, in the case in which the box-shaped bodies 13 are H-shaped (FIGS. 1 to 17), each box-shaped body 13 encloses one or two pairs of magnetic bodies 14 inside it, adapted for interacting with the links 101 both of the forward branch and of the return branch. In this case (H-shaped box-shaped bodies), advantageously, each pair of magnetic bodies 14 comprises only two magnetic bodies each of which has a height h measured perpendicular to the sliding plane defined by the chain comprised between 8 mm and 25 mm and preferably equal to 16 mm. Each magnetic body 14 preferably comprises a single body made of ferromagnetic material with a single north pole and a single south pole. The magnetic bodies 14 of each pair are arranged so that one has its south pole oriented towards the bottom of the forward channel of the guide 10 and the other has its north pole oriented towards the bottom of the forward channel of the guide 10, without interposition of any ferromagnetic joining plate between them.

This does not rule out the possibility that each magnetic body 14 comprises a plurality of ferromagnetic elements stacked on top of one another oriented so that the north pole of one faces the south pole of the other. For example each magnetic body 14 could comprise the juxtaposition of two ferromagnetic elements each of height equal to 8 mm.

As can be seen from the attached figures, the magnetic bodies 14 are sized and arranged so that they extend for a first portion beneath the bottom of the forward channel and/or of the return channel of the guide 10 and, preferably, for a second portion beneath the first constraining projections 16 and if present, the second constraining projections 18 or the guide projections 17.

Each of the first guide profiles 15 comprises a single body that extends continuously along the transport direction A-A.

Each of the first guide profiles 15 has an L, U or C-shaped cross section and comprises a first continuous band 15a, that laterally delimits the forward channel of the guide 10 and along which the hinging portions of the links slide, in particular at the inner side of the curve, and a second continuous band 15b that is joined at about 90° to the first band 15a and that defines a sliding surface for at least one part of the plate-shaped portions 103 of the chain links to slide thereon. The second band 15b is intended to rest on the end surfaces 160 of the first constraining projections 16.

Each first guide profile 15 is coupled and removably fixed to the first constraining projections 16 that are aligned, spaced apart from one another, along one of the two rows of slots in which they are inserted.

In other words, the first constraining projections 16 that are inserted in the slots 12 of one of the two rows of slots of the plate-shaped body 11 define a discontinuous body (in the longitudinal development direction of the plate-shaped body 11) by the constraint on it of a respective first guide profile 15.

Each first guide profile 15 can be coupled with the respective first constraining projections 16 with a shape coupling, interlocking coupling, snap coupling, interference coupling, friction coupling, obstacle coupling or coupling by magnetic interaction with the field generated by the same magnetic bodies 14, in this last case it being necessary for the same first guide profile 15 to be at least in part made of a material reactive to the magnetic field.

With particular reference to the embodiments shown in the attached figures, each first guide profile 15 is coupled with the respective first constraining projections 16 with an interlocking coupling that exploits a relative elasticity of the first guide profiles 15 themselves. Such a coupling comprises a tooth 25 formed projecting along the free edge of the respective first band 15a of the first guide profile 15 and that inserts in a corresponding groove 26 formed as an undercut at the base of the inner side surfaces of the first constraining projections 16, i.e. of the surfaces of the first constraining projections 16 that face towards the forward channel.

Each first guide profile 15 also comprises a flap 27 that is formed projecting from the edge of the second band 15b opposite the one that joins to the first band 15a and that externally embraces the respective first constraining projections 16.

However, this does not rule out alternative embodiments, thus for example the flap 27 could also be shaped so as to insert in a corresponding groove formed at the outer side surfaces of the first constraining projections 16.

Figure 15:
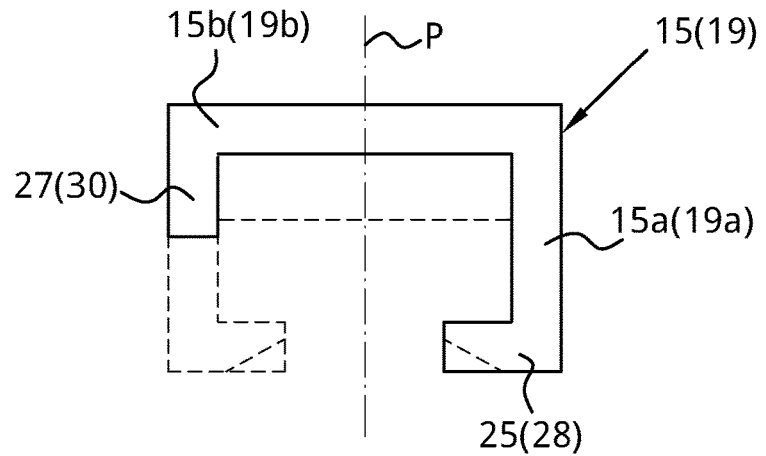
FIG. 15 schematically shows a section of the first guide profiles and of the second guide profiles according to two possible embodiments.

In a possible embodiment each first guide profile 15 has a symmetrical cross section with respect to a vertical longitudinal plane P as shown in FIG. 15 with a broken line and in the FIGS. 18 to 26. Such a configuration of the first guide profiles 15 makes it possible to avoid the phenomenon of deviated or biaxial flexing typical of asymmetrical profiles and that makes the mounting of the profile in a curve more complex since it induces a deformation out of the work plane of the chain.

It should be noted that, preferably, the height of the first band 15a of each first guide profile 15 is such as to entirely cover the portion of the first constraining projections 16 that projects from the upper surface 11a of the plate-shaped body 11 on which it rests with its free edge.

In the case in which the guide 10 also comprises the second guide profiles 19 coupled with the second constraining projections 18 (FIGS. 10-14), the configuration and the coupling of the second guide profiles 19 and of the second constraining projections 18 are advantageously analogous to those of the first guide profiles 15 and of the respective first constraining projections 16.

With reference to FIGS. 10 to 14, each second guide profile 19 comprises a single body that extends continuously along the transport direction A-A.

Each of the second guide profiles 19 has an L, U or C-shaped cross section and comprises a first continuous band 19a that laterally delimits the return channel of the guide 10 and along which the hinging portions of the links slide, in particular at the inner side of the curve, and a second continuous band 19b that is joined at about 90° to the first band 19a and that defines a sliding surface for at least one part of the plate-shaped portions 103 of the chain links to slide thereon. The second band 19b is intended to rest on the end surface 180 of the second constraining projections 18.

Each second guide profile 19 is coupled and removably fixed to the second constraining projections 18 that are aligned, spaced apart from one another, along one of the two rows of slots, i.e. along the respective development direction B-B, C-C.

In other words, the second constraining projections 18 that are aligned with one another spaced apart along each of the development directions B-B, C-C define a discontinuous body (in the longitudinal development direction of the plate-shaped body 11) for the constraining thereon of a respective second guide profile 19.

Each second guide profile 19 can be coupled with the respective second constraining projections 18 with a shape coupling, interlocking coupling, snap coupling, interference coupling, friction coupling, obstacle coupling or coupling by magnetic interaction with the field generated by the same magnetic bodies 14, in this last case it being necessary for the same second guide profile 19 to be at least in part made of a material reactive to the magnetic field.

With particular reference to the embodiment shown in the attached figures, each second guide profile 19 is coupled with the respective second constraining projections 18 with an interlocking coupling. Such a coupling comprises a tooth 28 formed projecting along the free edge of the respective first band 19a of the second guide profile 19 and that inserts in a corresponding groove 29 formed as an undercut at the base of the inner side surfaces of the second constraining projections 18, i.e. of the surfaces of the second constraining projections 18 that face towards the return channel.

Each second guide profile 19 also comprises a flap 30 that is formed projecting from the edge of the second band 19b opposite the one that joins to the first band 19a and that externally embraces the respective second constraining projections 18.

However, this does not exclude alternative embodiments, thus for example the flap 30 could also be shaped so as to insert in a corresponding groove formed at the outer side surfaces of the second constraining projections 18.

In a possible embodiment each second guide profile 19 has a symmetrical cross section with respect to a vertical longitudinal plane P as shown in FIG. 15 with a broken line.

It should be noted that, preferably, the height of the first band 19a of each second guide profile 19 is such as to entirely cover the portion of the second constraining projections 18 that projects out from the lower surface 13b of the respective box-shaped bodies 13 on which it rests with its free edge.

Both the first guide profiles 15, and, if present, the second guide profiles 19, are respectively mounted on the first constraining projections 16 and on the second constraining projections 18 by thrusting and/or forcing.

In particular, the first guide profiles 15 are mounted on the respective first constraining projections 16 from above and from the inside of the forward channel without needing to dismount the entire guide 10 and in particular the respective plate-shaped body 11.

For this purpose the first constraining projections 16 can have longitudinal bevels 162 adapted for facilitating the coupling with them of the first guide profiles 15.

The support structure of the guide 10 according to the present disclosure can also comprise at least one pair of support elements 36 of the first guide profiles 15 that is arranged at least one of the two opposite ends of the two rows of first constraining projections 16, wherein the support elements 36 of said at least one pair face one another with distance between centres substantially equal to the distance between the development directions B-B and C-C and are arranged along a portion of the respective development direction B-B, C-C or along a rectilinear portion tangent to it, wherein each of said support elements 36 couples with an end portion of the respective first guide profile 15. In a preferred embodiment, at least one pair of support elements 36 of the first guide profiles 15 is arranged at each of the two opposite ends of the two rows of first constraining projections 16.

In a preferred embodiment, two or more pairs of support elements 36 of the first guide profiles 15 are arranged at one or both of the two opposite ends of the two rows of first constraining projections 16, the support elements 36 of said pairs being arranged in succession one after the other and spaced apart from one another along the respective said portion.

Said support elements 36 indeed support the respective first guide profile 15 along an end portion thereof entering/exiting the guide 10, such a portion being curvilinear or rectilinear.

The support elements 36 of the pair of support elements furthest from the first constraining projections 16 have a distance D from the end edge of the guide 10 comprised between 0 mm and 20 mm.

The support elements 36 are generally mushroom shaped with a stem 360 for fixing to the support structure and a head 361 for coupling with the respective first guide profile 15.

With reference to the attached figures, in which the support structure comprises a plate-shaped body 11, the stem 360 inserts in a corresponding seat 37 formed in it so that the head 361 projects from the upper surface of the plate-shaped body 11.

The form of the coupling between the stem 360 and the seat 37 as well as that of the head 361 can be various, as shown in FIGS. 18 to 26.

Thus, for example, the coupling between the stem 360 and the respective seat 37 can be by force-fitting, interlocking, dovetailing, T-coupling or similar. The stem 360 can for example be cylinder-shaped, prismatic, dovetailed, T-shaped or other, the seat 37 having a shape matching it, being able to comprise, respectively, a hole, a slot, a prismatic, dovetail, T-shaped groove or other.

The head 361 can be disc-shaped, prismatic or even copying the shape of the first constraining projections 16.

In a possible embodiment, the guide 10 extends at its opposite ends in rectilinear guide portions 31, 32 beyond which there are pads 33, 34 for accompanying the return branch of the chain entering and exiting the return channel.

Said rectilinear guide portions 31, 32 can be formed in one piece with the plate-shaped body 11 or comprise separate elements fixed to the plate-shaped body 11 fixedly connected to it.

In this case, the support elements 36 are distributed along such rectilinear guide portions 31, 32 to support the end portions of the respective first guide profiles 15.

Using 11d to indicate the end edge of the guide 10 at each of its rectilinear guide portions 31, 32, the support elements 36 of the pair of support elements furthest from the first constraining projections 16 have a distance D comprised between 0 mm and 20 mm from the end edge 11d.

It will be clear to those skilled in the art that said support elements 36 can also be adopted in the embodiments in which the box-shaped bodies 13 are H-shaped, like for example in the embodiments shown in FIGS. 1 to 17. It is also clear that such support elements 36 can also be provided to support the end portions of the second guide profiles 19 if present.

FIGS. 1 to 9 show a first embodiment in which the box-shaped bodies 13 are H-shaped and in which the first guide profiles 15 and the portion of the upper surface 11a of the plate-shaped body 11 that extends between them define a forward guide for guiding the forward branch of the chain 100. The forward guide comprises a forward channel, in which the hinging portions 102 of the links 101 are received and that is laterally delimited by the pair of first guide profiles 15 and on the bottom by the portion of the upper surface 11a of the plate-shaped body 11 that extends between them or rather between the respective first bands 15a.

The first guide profiles 15, or rather their second bands 15b, each define a sliding surface for at least one part of the plate-shaped portion 103 of the links 101 to slide thereon.

The magnetic bodies 14 interact with the links 101 or with their pins 104 to attract the links 101 with part of their plate-shaped portions 103 against the respective sliding surfaces defined by the first guide profiles 15.

In such an embodiment, the pairs of guide projections 17 of the box-shaped bodies 13 and the portion of the lower surface 13b of the box-shaped bodies 13 that extends between the guide projections 17 of each pair define a return guide for guiding the return branch of the chain 100.

The return guide comprises at least one return channel, in which the hinging portions 102 of the links are received and which is laterally delimited by the guide projections 17, or rather by their mutually facing inner side surfaces, and on the bottom by the portion of the lower surface 13b of the box-shaped bodies 13 that extends between the guide projections 17 of each pair.

The guide projections 17 aligned along each of the two rows of slots or rather along the respective development direction B-B, C-C define a respective discontinuous sliding surface 170 for at least one part of the plate-shaped portion 103 of the links 101 to slide thereon.

The same magnetic bodies 14 interact with the links 101 or with their pins 104 to attract the links 101 with part of their plate-shaped portions 103 against the respective discontinuous sliding surfaces 170 defined by the guide projections 17 aligned along the two rows of slots or rather along the development directions B-B, C-C.

The magnetic bodies 14 thus hold the chain both along the forward channel and along the return channel.

The guide 10 extends at its opposite ends in rectilinear guide portions 31, 32 beyond which there are pads 33, 34 for accompanying the return branch of the chain entering and exiting the return channel.

The embodiment shown in FIGS. 10 to 14 differs from that according to FIGS. 1 to 9, solely for the structure of the return channel. In this case, indeed, the return channel for guiding the return branch of the chain is delimited by the second guide profiles 19 and by the portion of the lower surface 13b of the box-shaped bodies 13 that extends between them. The second guide profiles 19, or rather the second band 19b thereof, each define a respective continuous sliding surface for at least one part of the plate-shaped portion 103 of the links 101 to slide thereon, against which they are held thanks to the magnetic interaction between the magnetic bodies 14 and the links 101 or their pins.

FIGS. 18 to 26, on the other hand, show an embodiment in which the box-shaped bodies 13 are C or U-shaped and in which the first guide profiles 15 and the portion of the upper surface 11a of the plate-shaped body 11 that extends between them define a forward guide for guiding the forward branch of the chain 100. The forward guide comprises a forward channel, in which the hinging portions 102 of the links 101 are received and that is laterally delimited by the pair of first guide profiles 15 and on the bottom by the portion of the upper surface 11a of the plate-shaped body 11 that extends between them or rather between the respective first bands 15a.

The first guide profiles 15, or rather their second bands 15b, each identify a sliding surface for at least one part of the plate-shaped portion 103 of the links 101 to slide on it.

The magnetic bodies 14 interact with the links 101 or with their pins 104 to attract the links 101 with part of their plate-shaped portions 103 against the respective sliding surfaces defined by the first guide profiles 15. Advantageously, the second half-shell 131 comprises a metallic gap plate cooperating with the magnetic bodies 14.

The lower surface 13b of the box-shaped bodies 13 is substantially flat, without projections or protrusions. The guide of the return branch 100B, not shown in FIGS. 18 to 26, as stated above, can be of the mechanical type according to one of the known solutions.

At the exit end of the guide 10 there are also support elements 36 of the first guide profiles 15 as described above.

It should be specified that components described with reference to one of the embodiments shown in the attached figures can also be adopted singularly in the other embodiments, provided that they are compatible with them.

This refers, for example, to the plate-shaped body 11, to the configuration of the first guide profiles 15 and of the first constraining projections 16 or to the support elements 36, components that can be adopted for example in all possible embodiments of the guide according to the present disclosure and, in particular, both in the case in which the box-shaped bodies 13 are C or U-shaped, and in the case in which the box-shaped bodies 13 are H-shaped.

The mounting and the operation of a curved magnetic guide according to the present disclosure can be immediately understood by those skilled in the art in light of the attached figures and the description given above.

Briefly, each magnetic body 14 or a pair thereof is inserted and enclosed in a box-shaped body 13.

With reference to the illustrated embodiments, a plurality of box-shaped bodies 13 is coupled with the plate-shaped body 11 by inserting the respective first constraining projections 16 in the pairs of slots 12. Each box-shaped body 13 is then fixed to the plate-shaped body 11.

If provided, one or more pairs of support elements 36 is coupled along the end portions of the plate-shaped body 11.

The first guide profiles 15 are mounted on the first constraining projections 16 or on the portions thereof that project beyond the upper surface 11a of the plate-shaped body 11.

The end portions of the first guide profiles 15 also couple with the support elements 36, if present.

If provided, the second guide profiles 19 are mounted on the respective second constraining projections 18.

Figure 16:
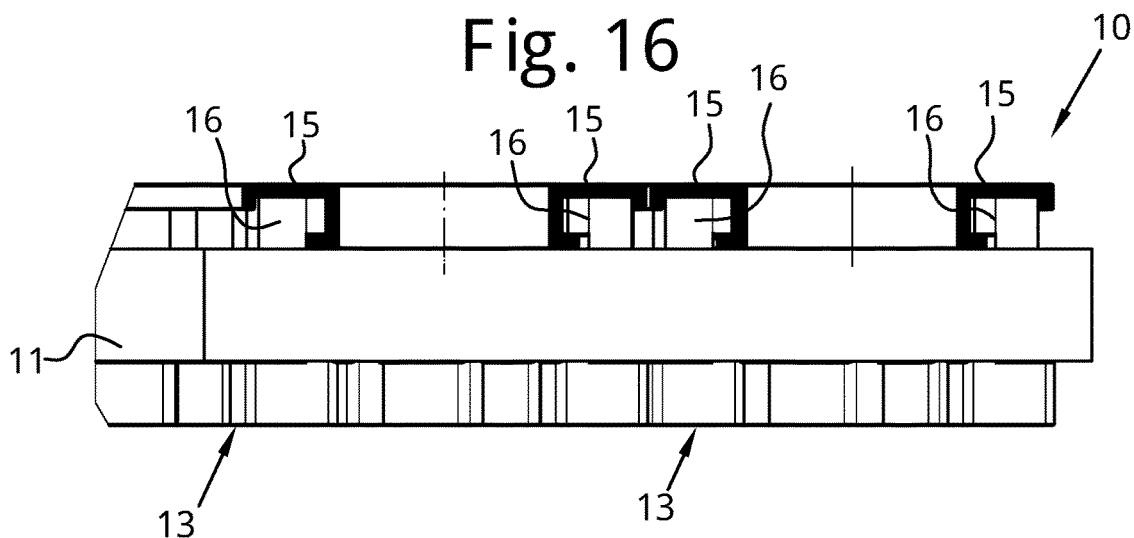
FIGS. 16 and 17 show schematic section views of a portion of a curved magnetic guide according to the present disclosure having a plurality of mutually adjacent guide channels.
Figure 17:
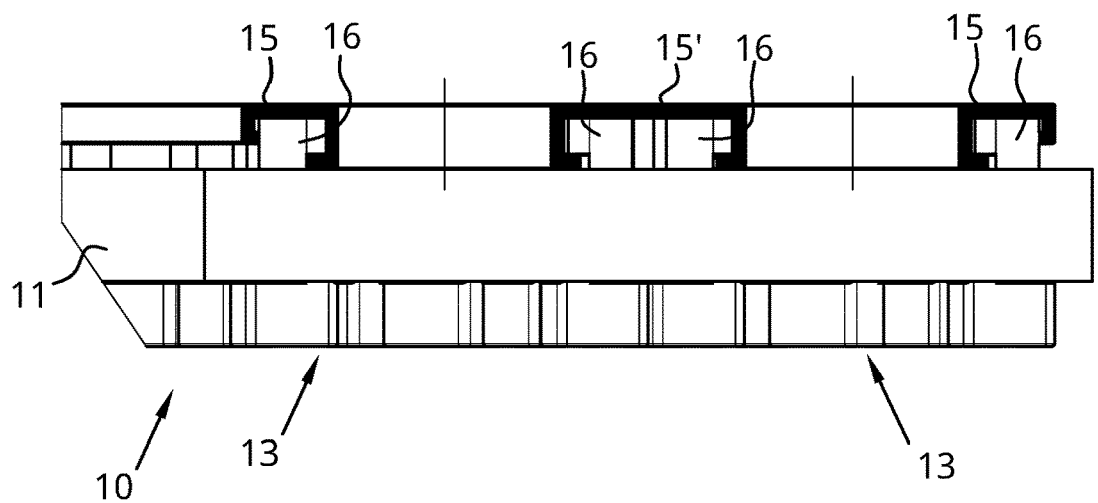

It is of course possible to provide multi-channel guides by arranging side-by-side guides 10 like those illustrated and described. Some possible examples of multi-channel guides are shown in FIGS. 16 and 17, in which, for example, in a same plate-shaped body 11 two pairs of rows of slots are provided with which two respective series of box-shaped bodies 13 are coupled, on the first constraining projections 16 of which respective first guide profiles 15 are coupled. The first guide profiles 15 coupled with the first constraining projections 16 of two adjacent rows (that extend between two adjacent channels) can comprise distinct bodies (FIG. 16) or of a single body 15' (FIG. 17). It should be specified that also in this case the coupling of the first guide profiles 15, 15' with the first constraining projections 16 could be configured differently.

It should be noted that to provide curved guides having a different length and/or radius of curvature, it is sufficient to make one or more different plate-shaped bodies 11 that are suitably shaped and to provide the first guide profiles 15 and the possible second guide profiles 19 of the necessary length.

The box-shaped bodies 13 whether C, U or H-shaped, with the relative magnetic bodies 14, on the other hand, remain unchanged and reusable to make different curved guides.

Said box-shaped bodies 13 act as protective cases of the magnetic bodies 14 inserted in them that are thus protected from dirt.

Said box-shaped bodies 13 are also easy to mount and dismount.

It should be noted, in particular, that the modular structure of the curved magnetic guide according to the present disclosure is particularly simple and compact, facilitating and speeding up the mounting and dismounting operations thereof or even only of wearing parts thereof, like for example the first guide profiles 15 and/or the second guide profiles 19.

The modular structure of the curved magnetic guide according to the present disclosure is particularly versatile and makes it possible to provide curved guides of different length and/or radius of curvature with a small number of elements.

The curved magnetic guide according to the present disclosure has low overall bulk, in particular in height.

In the case in which the box-shaped bodies are H-shaped and the magnetic bodies enclosed in them are used to hold the chain along the forward and return guide, the use of pairs of magnets as described above, in which each of them comprises only two magnetic bodies each having a height h comprised between 8 mm and 25 mm and which are spaced apart and separated without the use of any ferromagnetic connection plate thereof, offers different advantages:

it makes it possible to reduce the components of the guide and, therefore, the related production and mounting costs with respect to known solutions that entail the use of two pairs of magnets in which the magnets of every pair are joined by a ferromagnetic plate so as to form a U-shaped magnet;

it makes it possible to simplify the mounting operations of the pairs of magnets, being it only necessary to arrange the magnetic bodies singularly in the respective box-shaped bodies;

it makes it possible to keep down the height dimension of the plate-shaped body 11 and, therefore, the production costs thereof strictly correlated to the material necessary to make it.

These advantages are particularly notable in the case in which each magnetic body is made in one piece in a single body.

In any case, the magnetic bodies are such as to generate magnetic fields of intensity and distribution such as to ensure effective holding of the chain along the forward guide and/or along the return guide.

The curved magnetic guide for guiding a chain of a conveyor chain having improved modular structure according to the present disclosure thus conceived can undergo numerous modifications and variants, all of which are covered by the disclosure; moreover, all the details can be replaced by technically equivalent elements. In practice, the materials used, as well as the shapes and dimensions, can be whatever according to technical requirements.

The invention claimed is:

1. Curved magnetic guide for guiding the chain of a conveyor chain along a curvilinear transport direction, wherein said chain is at least partially made of magnetizable material, comprises a plurality of links, said links are hinged together at respective hinging portions by means of respective pins and each link is equipped with a plate-shaped portion defining a transport surface, and is closed to form a loop defining a forward branch and a return branch, wherein said guide wherein it comprises:

at least one pair of first guide profiles that are arranged spaced apart and that extend in a continuous manner along a respective development direction concentric to said curvilinear transport direction, a support structure for supporting said first guide profiles and that comprises at least a plurality of box-shaped bodies, said box-shaped bodies being arranged in succession one after the other and spaced apart from one another along said curvilinear transport direction, wherein each of said box-shaped bodies houses at least one magnetic body therein and has an upper surface and a lower surface opposite one another, wherein said upper surface is provided with a pair of first constraining projections that are spaced apart and faced with distances between centers substantially equal to the distance between said development directions wherein said first constraining projections of said plurality of box-shaped bodies define two rows of first constraining projections that extend, spaced apart from one another, along a respective said development direction, wherein each of said first guide profiles of said at least one pair is coupled with said first constraining projections aligned along one of said two rows, wherein said guide defines a forward guide for guiding the forward branch of said chain, said forward guide comprising a forward channel, which is adapted for receiving the hinging portions of said links and which is laterally delimited by said first guide profiles of said at least one pair, wherein said first guide profiles each defines a sliding surface for at least one part of said plate-shaped portion of said links to slide thereon, and wherein said magnetic bodies are adapted for interacting with said links or with their hinging pins to attract the links of said chain with said part of their plate-shaped portions against the respective said sliding surfaces defined by said first guide profiles.

2. Guide according to claim 1, wherein said support structure also comprises at least one plate-shaped body that is shaped like an arc of a curve that extends along said curvilinear transport direction, wherein said plate-shaped body has an upper surface and a lower surface that are opposite each other and is crossed by a plurality of through slots that extend between said lower surface and said upper surface, wherein said slots are distributed, spaced apart from one another, along two rows that extend, spaced apart, along a respective said development direction, each slot of one of said rows facing a respective slot of the other row so as to define pairs of facing slots, wherein said plate-shaped body comprises, at each of said pairs of facing slots, a respective hollow seat that is open at said lower surface of said plate-shaped body and that is adapted for receiving the box-shaped portion of a respective said box-shaped body that extends between said upper surface and said lower surface of the latter, and wherein each of said box-shaped bodies is coupled with said plate-shaped body at the bottom with the respective first constraining projections inserted in the slots of one of said pairs of slots and projecting for at least one part of their height beyond said upper surface of said plate-shaped body, and said box-shaped portion inserted in said respective hollow seat, said first guide profiles of said at least one pair being respectively coupled with the parts of the first constraining projections projecting beyond said upper surface of said plate-shaped body along one of said two rows of slots, wherein said forward channel is delimited on the bottom by said portion of said upper surface of said plate-shaped body that extends between said first guide profiles.

3. Guide according to claim 2, wherein the bottom of each said hollow seat is closed at a central portion thereof delimited laterally by the slots of said respective pair of slots, the surface of said bottom facing towards the inside of the respective hollow seat defining a support or abutment surface for the upper surface of the respective box-shaped body.

4. Guide according to claim 2, wherein said plate-shaped body consists of a single body obtained in one piece.

5. Guide according to claim 2, wherein the portion of said upper surface of said plate-shaped body that extends between said two rows of slots is flat and continuous.

6. Guide according to claim 1, wherein said support structure comprises at least one pair of support elements of said first guide profiles that is arranged at at least one of the two opposite ends of said two rows of first constraining projections, wherein the support elements of said at least one pair face one another with distance between centers substantially equal to the distance between said development directions and are arranged along a portion of the respective development direction or along a rectilinear portion tangent to it, wherein each of said support elements couples with an end portion of the respective first guide profile and wherein the support elements of the pair of support elements furthest from said first constraining projections is a distance-ED from an end edge of said guide comprised between 0 mm and 20 mm.

7. Guide according to claim 6, wherein said support structure comprises two or more of said pairs of support elements of said first guide profiles that are arranged at at least one of the two opposite ends of said two rows of first constraining projections, wherein the support elements of said pairs are arranged in succession one after the other and spaced apart from one another along the respective said portion.

8. Guide according to claim 1, wherein said lower surface of each of said box-shaped bodies is substantially flat.

9. Guide according to claim 1, wherein said lower surface of each of said box-shaped bodies is provided with a respective pair of guide projections that are spaced apart and face one another substantially parallel with distance between centers substantially equal to the distance between said development directions, wherein said guide projections of said plurality of box-shaped bodies define two rows of guide projections that extend, spaced apart, along a respective said development direction, wherein said pairs of guide projections of said box-shaped bodies and the portion of the lower surface of said box-shaped bodies that extends between the guide projections of each pair define a return guide for the guiding of the return branch of said chain, wherein said return guide comprises at least one return channel, which is adapted for receiving the hinging portions of said links and which is laterally delimited by said guide projections and on the bottom by the portion of the lower surface of said box-shaped bodies that extends between the guide projections of each pair, and wherein the guide projections aligned along each of said rows define a respective discontinuous sliding surface for the sliding thereon of at least one part of said plate-shaped portion of said links.

10. Guide according to claim 9, wherein said magnetic bodies are adapted for interacting with said links or with their hinging pins to attract the links of said chain with said part of their plate-shaped portions against the respective said discontinuous sliding surfaces defined by said guide projections.

11. Guide according to claim 1, wherein said lower surface of each of said box-shaped bodies is provided with a respective pair of second constraining projections, which are spaced apart and facing with distance between centers substantially equal to the distance between said development directions, wherein said second constraining projections of said plurality of box-shaped bodies define two rows of second constraining projections that extend, spaced apart, along a respective said development direction, wherein said guide also comprises a pair of second guide profiles that extend in a continuous manner along said development directions and that are respectively coupled with said second constraining projections aligned along one of said two rows, wherein said pair of second guide profiles and the portion of the lower surface of said box-shaped bodies that extends between them defines a return guide for guiding the return branch of said chain, wherein said return guide comprises at least one return channel, which is adapted for receiving the hinging portions of said links and which is laterally delimited by said second guide profiles and on the bottom by the portion of the lower surface of said box-shaped bodies that extend between them, and wherein said second guide profiles each define a respective sliding surface for the sliding thereon of at least one part of said plate-shaped portion of said links.

12. Guide according to claim 11, wherein said magnetic bodies are adapted for interacting with said links or with their hinging pins to attract the links of said chain with said part of their plate-shaped portions against the respective said sliding surfaces defined by said second guide profiles.

13. Guide according to claim 11, wherein each of said second guide profiles has an L, C or U-shaped cross section.

14. Guide according to claim 11, wherein each of said second guide profiles is coupled with said constraining projections with a shape coupling, interlocking coupling, snap coupling, interference coupling, friction coupling, obstacle coupling or coupling by magnetic interaction with the field generated by said magnetic bodies.

15. Guide according to claim 1, wherein each of said first guide profiles has an L, C or U-shaped cross section.

16. Guide according to claim 1, wherein each of said first guide profiles is coupled with said first constraining projections with a shape coupling, interlocking coupling, snap coupling, interference coupling, friction coupling, obstacle coupling or coupling by magnetic interaction with the field generated by said magnetic bodies.

17. Guide according to claim 1, wherein each of said box-shaped bodies comprises a first half-shell and a second half-shell that are coupled with each other and removably fixed, wherein said first half-shell defines said upper surface of the respective box-shaped body provided with said pair of first constraining projections and wherein said second half-shell defines said lower surface of the respective box-shaped body.

18. Guide according to claim 1, wherein each of said box-shaped bodies comprises at least one pair of said magnetic bodies.

19. Guide according to claim 10, wherein each of said box-shaped bodies comprises only two magnetic bodies each of which has a height h measured perpendicular to said sliding surfaces comprised between 8 mm and 25 mm.

20. Guide according to claim 19, wherein each of said magnetic bodies of each of said pairs consists of a single body made of ferromagnetic material with a single north pole and a single south pole, one of the two magnetic bodies of each of said pairs of magnets being arranged with its south pole oriented towards the bottom of said forward channel and the other of the two magnetic bodies of each of said pairs of magnets being arranged with its north pole oriented towards the bottom of said forward channel, without interposition of any ferromagnetic joining plate of said two magnetic bodies.

\* \* \* \* \*